US009535544B2

(12) United States Patent
Yousefpor et al.

(10) Patent No.: US 9,535,544 B2
(45) Date of Patent: Jan. 3, 2017

(54) REDUCING TOUCH PIXEL COUPLING

(71) Applicant: Apple Inc., Cupertino, CA (US)

(72) Inventors: Marduke Yousefpor, San Jose, CA (US); Taif Ahmed Syed, Cupertino, CA (US); Ahmad Al-Dahle, Santa Clara, CA (US); Kevin J. White, Los Gatos, CA (US); Abbas Jamshidi-Roudbari, Sunnyvale, CA (US); Stephen S. Poon, San Jose, CA (US)

(73) Assignee: Apple Inc., Cupertino, CA (US)

( * ) Notice: Subject to any disclaimer, the term of this patent is extended or adjusted under 35 U.S.C. 154(b) by 206 days.

(21) Appl. No.: 13/907,698

(22) Filed: May 31, 2013

(65) Prior Publication Data

US 2014/0354586 A1    Dec. 4, 2014

(51) Int. Cl.
*G06F 3/044* (2006.01)
*G06F 3/041* (2006.01)

(52) U.S. Cl.
CPC ............. *G06F 3/044* (2013.01); *G06F 3/0412* (2013.01); *G06F 2203/04107* (2013.01)

(58) Field of Classification Search
CPC   G06F 3/0488; G06F 3/04883; G06F 3/04886; G06F 3/045; G06F 3/044; G06F 3/0412; G06F 3/0416; G06F 3/046; G06F 2203/04107
See application file for complete search history.

(56) References Cited

U.S. PATENT DOCUMENTS 5,483,261 A    1/1996   Yasutake
5,488,204 A    1/1996   Mead et al.
5,825,352 A    10/1998  Bisset et al.
5,835,079 A    11/1998  Shieh
5,880,411 A    3/1999   Gillespie et al.
6,188,391 B1   2/2001   Seely et al.
(Continued)

FOREIGN PATENT DOCUMENTS

JP    2000-163031 A    6/2000
JP    2002-342033 A    11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Christopher E Leiby
(74) *Attorney, Agent, or Firm* — Morrison & Foerster LLP

(57) ABSTRACT

A touch screen to reduce touch pixel coupling. In some examples, the touch screen can include a first display pixel and a second display pixel in a row of display pixels, where the first display pixel can be configurable to be decoupled from the second display pixel during at least a touch sensing phase of the touch screen. In some examples, the touch screen can include a display pixel having a first and a second transistor, where the second transistor can be electrically connected to a gate terminal of the first transistor, and can be diode-connected. In some examples, the touch screen can include two display pixels, each display pixel having two transistors, where two of the transistors can be electrically connected to a first gate line, and the remaining two transistors can be individually electrically connected to a second and third gate line, respectively.

26 Claims, 13 Drawing Sheets

(56) References Cited

U.S. PATENT DOCUMENTS

| | | |
|---|---|---|
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 2006/0026521 A1 | 2/2006 | Hotelling et al. |
| 2006/0097991 A1* | 5/2006 | Hotelling et al. ............ 345/173 |
| 2006/0197753 A1 | 9/2006 | Hotelling |
| 2010/0001973 A1* | 1/2010 | Hotelling et al. ............ 345/174 |
| 2010/0194695 A1* | 8/2010 | Hotelling et al. ............ 345/173 |
| 2010/0194698 A1* | 8/2010 | Hotelling et al. ............ 345/173 |
| 2011/0298727 A1 | 12/2011 | Yousefpor et al. |
| 2014/0327654 A1 | 11/2014 | Sugita et al. |
| 2015/0116243 A1 | 4/2015 | Saitou et al. |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

\* cited by examiner

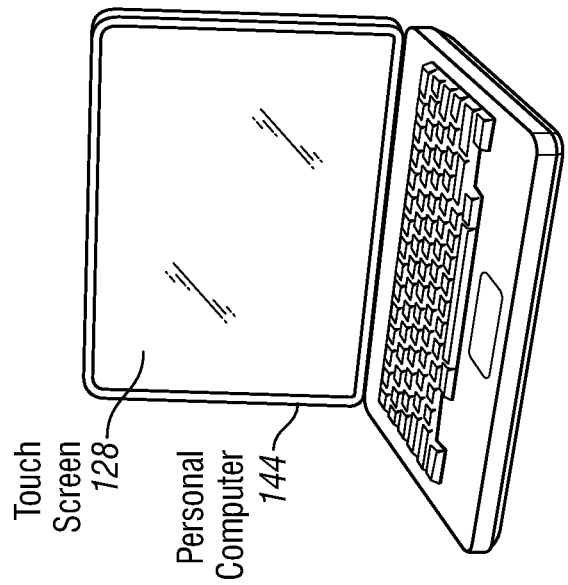
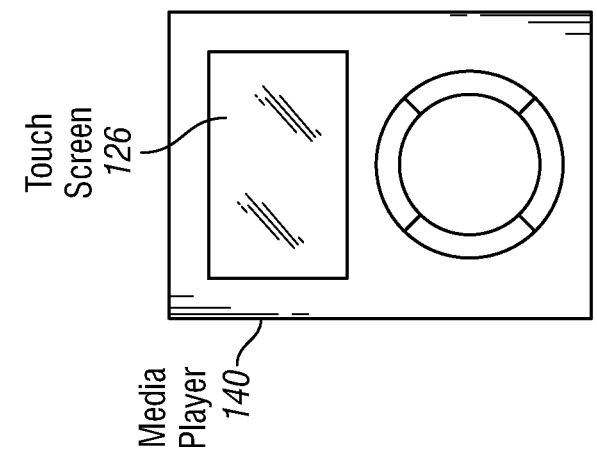
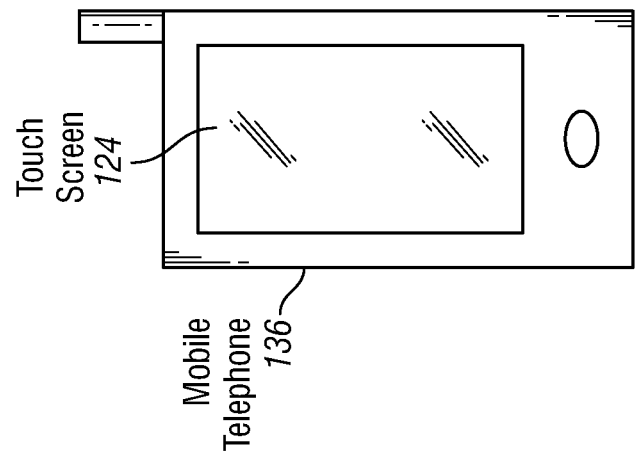

REDUCING TOUCH PIXEL COUPLING

FIELD OF THE DISCLOSURE

This relates generally to touch sensing, and more particularly to reducing touch pixel coupling.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device.

Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing fields used to detect touch can extend beyond the surface of the display, and objects approaching the surface may be detected near the surface without actually touching the surface.

Capacitive touch sensor panels can be formed from a matrix of drive and sense lines of a substantially transparent conductive material, such as Indium Tin Oxide (ITO), often arranged in rows and columns in horizontal and vertical directions on a substantially transparent substrate. It is due in part to their substantial transparency that capacitive touch sensor panels can be overlaid on a display to form a touch screen, as described above. Some touch screens can be formed by integrating touch sensing circuitry into a display pixel stackup (i.e., the stacked material layers forming the display pixels). This integration of the touch hardware and display hardware can lead to parasitic capacitive pathways that can interfere with normal touch detection.

SUMMARY OF THE DISCLOSURE

The following description includes examples of reducing or eliminating touch pixel coupling in a touch screen that can interfere with normal touch detection during a touch sensing phase of the touch screen. Such touch pixel coupling can be caused by parasitic capacitive pathways that can exist over a shared gate line electrically connected to display pixels in both drive and sense regions of the touch screen.

In one example, display pixels in drive regions of the touch screen can be connected to different gate lines than display pixels in sense regions of the touch screen. In another example, the shared gate line between display pixels can include a decoupling portion that can temporarily decouple the shared gate. In another example, display pixels can include a diode-connected transistor electrically connected between the shared gate line and a gate terminal of another transistor in the display pixel. In another example, display pixels in drive regions can be electrically connected to the shared gate line and a second gate line, and display pixels in sense regions can be electrically connected to the shared gate line and a third gate line, different from the second gate line. The connections to the second and third gate lines can be such so as to reduce touch pixel coupling.

BRIEF DESCRIPTION OF THE DRAWINGS

FIG. 1A illustrates an example mobile telephone that includes a touch screen.

FIG. 1B illustrates an example digital media player that includes a touch screen.

FIG. 1C illustrates an example personal computer that includes a touch screen.

DETAILED DESCRIPTION

Figure 2:
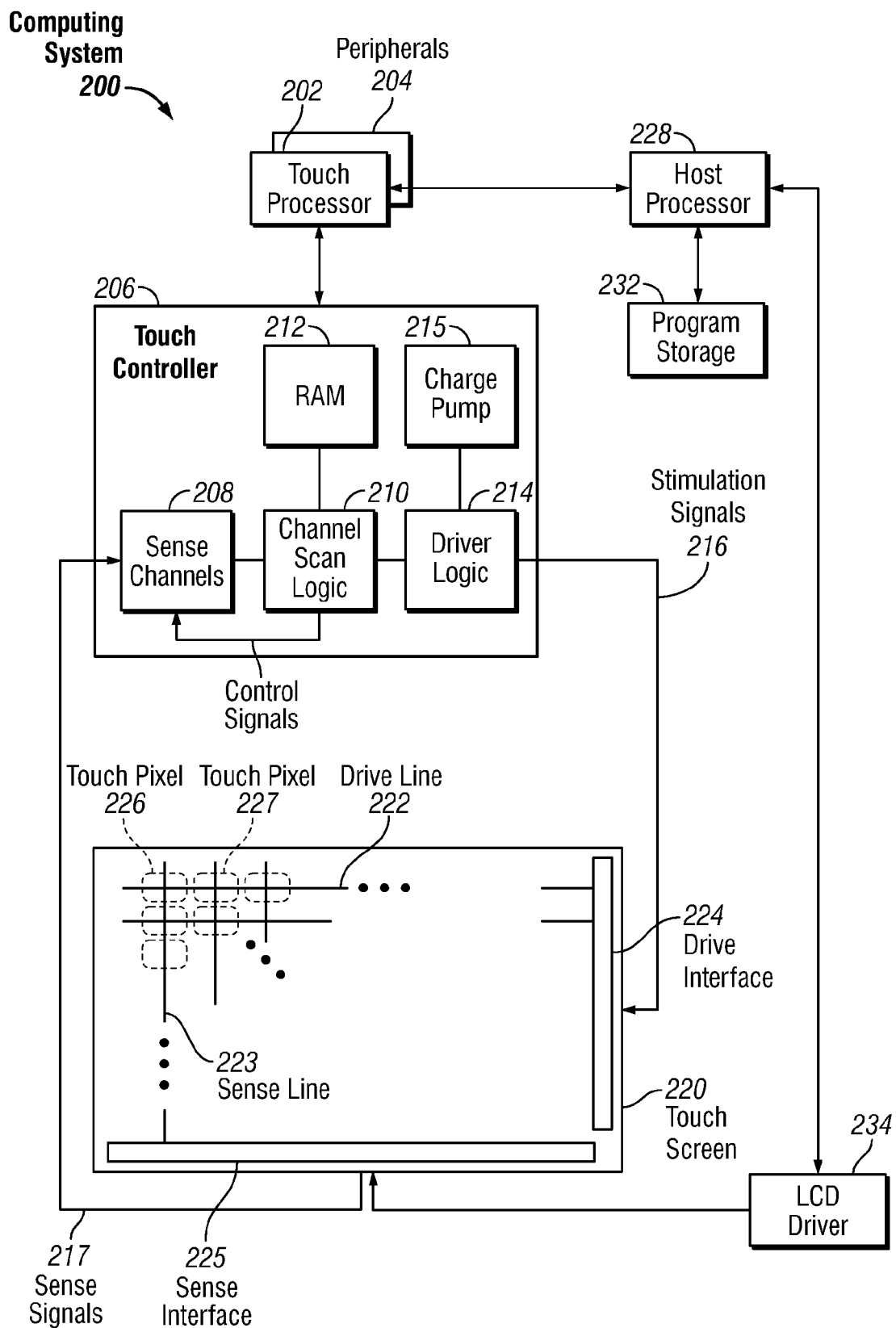
FIG. 2 is a block diagram of an example computing system that illustrates one implementation of an example touch screen according to examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Some touch screens can be formed by integrating touch sensing circuitry into a display pixel stackup (i.e., the stacked material layers forming the display pixels). This integration of the touch hardware and display hardware can lead to parasitic capacitive pathways that can interfere with normal touch detection. In one example, one or more display pixels in a drive region segment of the touch screen can be electrically connected to the same gate line as one or more display pixels in a sense region of the touch screen. This common connection can result in direct parasitic coupling between the one or more display pixels in the drive and sense regions. During a touch sensing phase of the touch screen, this parasitic coupling can cause unwanted perturbation of touch signals detected by the detection circuitry in the touch screen. However, the effect of the parasitic capacitive coupling pathway can be reduced by severing, to various degrees, the parasitic pathway from a drive common electrode to a sense common electrode.

FIGS. 1A-1C show example systems in which a touch screen according to examples of the disclosure may be implemented. FIG. 1A illustrates an example mobile telephone 136 that includes a touch screen 124. FIG. 1B illustrates an example digital media player 140 that includes a touch screen 126. FIG. 1C illustrates an example personal computer 144 that includes a touch screen 128. Although not shown in the figures, the personal computer 144 can also be a tablet computer or a desktop computer with a touch-sensitive display. Touch screens 124, 126, and 128 may be based on, for example, self capacitance or mutual capacitance, or another touch sensing technology. For example, in a self capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen. A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

FIG. 2 is a block diagram of an example computing system 200 that illustrates one implementation of an example touch screen 220 according to examples of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC).

Computing system 200 can also include a host processor 228 for receiving outputs from touch processor 202 and performing actions based on the outputs. For example, host processor 228 can be connected to program storage 232 and a display controller, such as a Liquid-Crystal Display (LCD) driver 234. It is understood that although the examples of the disclosure are described with reference to LCD displays, the scope of the disclosure is not so limited and can extend to other types of displays, such as Light-Emitting Diode (LED) displays, including Active-Matrix Organic LED (AMO-LED) and Passive-Matrix Organic LED (PMOLED) displays.

Host processor 228 can use LCD driver 234 to generate an image on touch screen 220, such as an image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (i.e., a pattern of fingers touching the touch screen).

Figure 3:
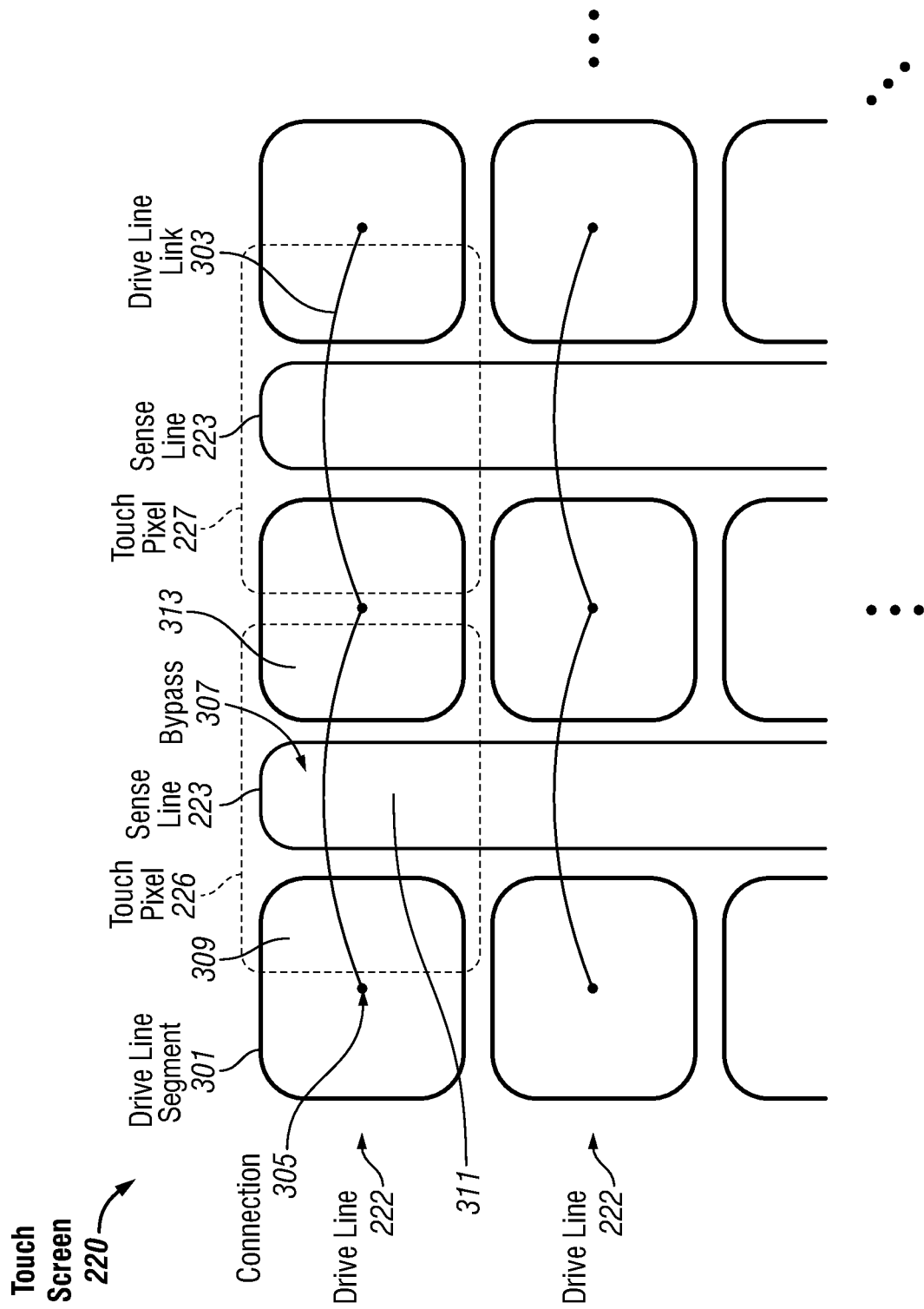
FIG. 3 is a more detailed view of a touch screen showing an example configuration of drive lines and sense lines according to examples of the disclosure.

In some examples, touch screen 220 can be an integrated touch screen in which touch sensing circuit elements of the touch sensing system can be integrated into the display pixel stackups of a display. An example integrated touch screen in which examples of the disclosure can be implemented will now be described with reference to FIGS. 3-6. FIG. 3 is a more detailed view of touch screen 220 showing an example configuration of drive lines 222 and sense lines 223 according to examples of the disclosure. As shown in FIG. 3, each drive line 222 can be formed of one or more drive line segments 301 that can be electrically connected by drive line links 303 at connections 305. Drive line links 303 are not electrically connected to sense lines 223, rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the example configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line.

In some examples, the configuration of drive lines 222 and sense lines 223 can be the reverse of that shown in FIG. 3. That is to say that each drive line 222 can be formed of a single drive line segment, whereas each sense line 223 can be formed of one or more sense line segments that can be electrically connected by sense line links. Further, in some examples, guard lines can exist between drive line segments 301 and sense lines 223. Such guard lines can shield display pixel elements in sense lines from direct coupling to display pixel elements in adjacent drive line segments. For ease of description, the examples of the disclosure will be described with reference to the drive and sense line configuration of FIG. 3, although it is understood that the scope of the disclosure is not so limited.

Figure 4:
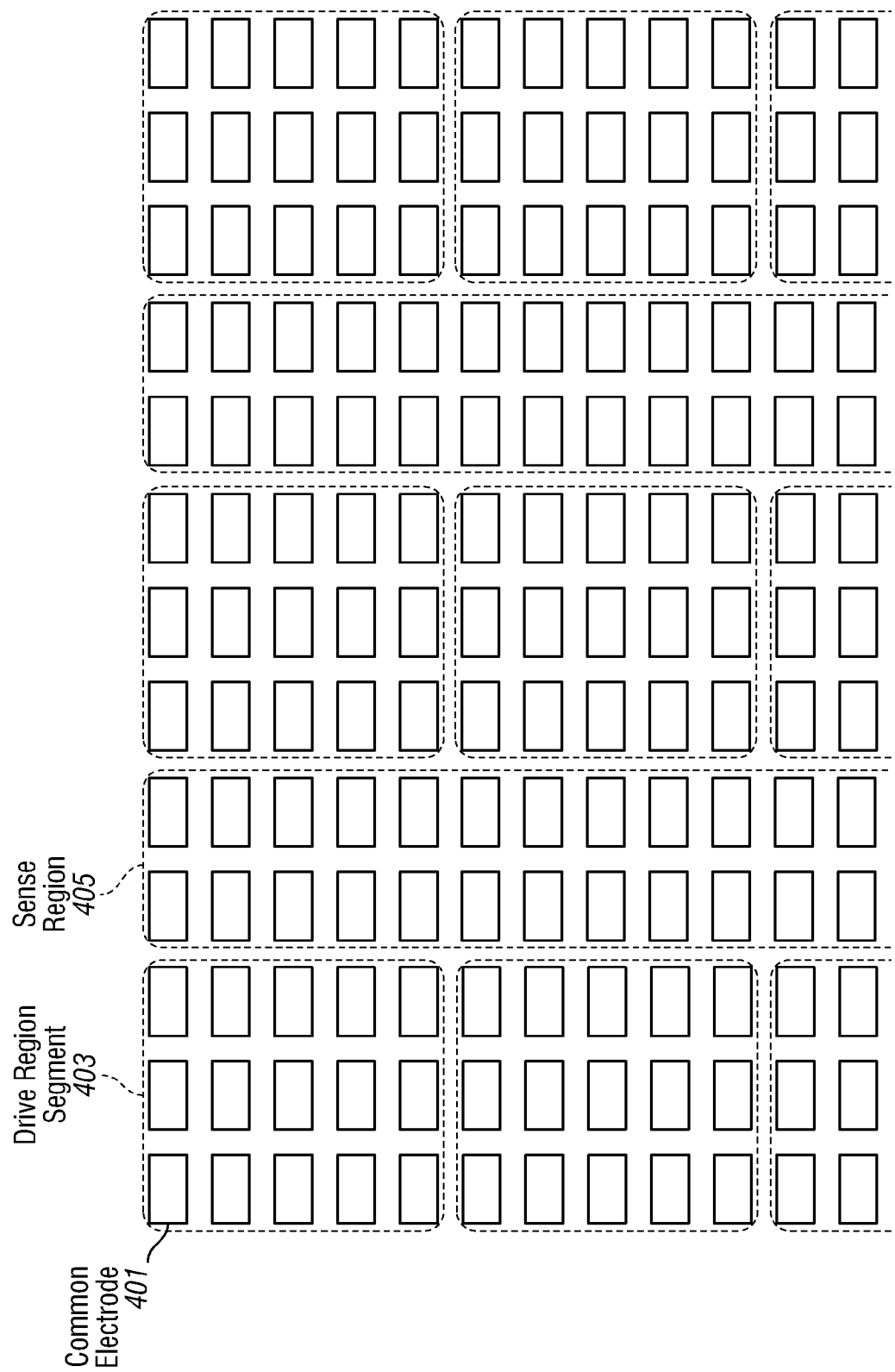
FIG. 4 illustrates an example configuration in which common electrodes (Vcom) can form portions of the touch sensing circuitry of a touch sensing system.

The circuit elements in display pixel stackups can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an example configuration in which common electrodes (Vcom) can form portions of the touch sensing circuitry of a touch sensing system. Each display pixel includes a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stackups can be multi-function circuit elements and other circuit elements may be single-function circuit elements. In other examples, all of the circuit elements of the display pixel stackups may be single-function circuit elements.

In addition, although examples herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some examples circuit elements can be grouped to form a continuous touch signal line of one type and a segmented touch signal line of another type. For example, FIG. 4 shows one example in which drive region segments 403 and sense regions 405 correspond to drive line segments 301 and sense lines 223 of touch screen 220. Other configurations are possible in other examples; for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some examples, a touch pixel of the configuration of FIG. 4 can include, for example, a 64×64 area of display pixels. However, the drive and sense regions are not limited to the shapes, orientations, and positions shown, but can include any suitable configurations according to examples of the disclosure. It is to be understood that the display pixels used to form the touch pixels are not limited to those described above, but can be any suitable size or shape to permit touch capabilities according to examples of the disclosure.

Figure 5:
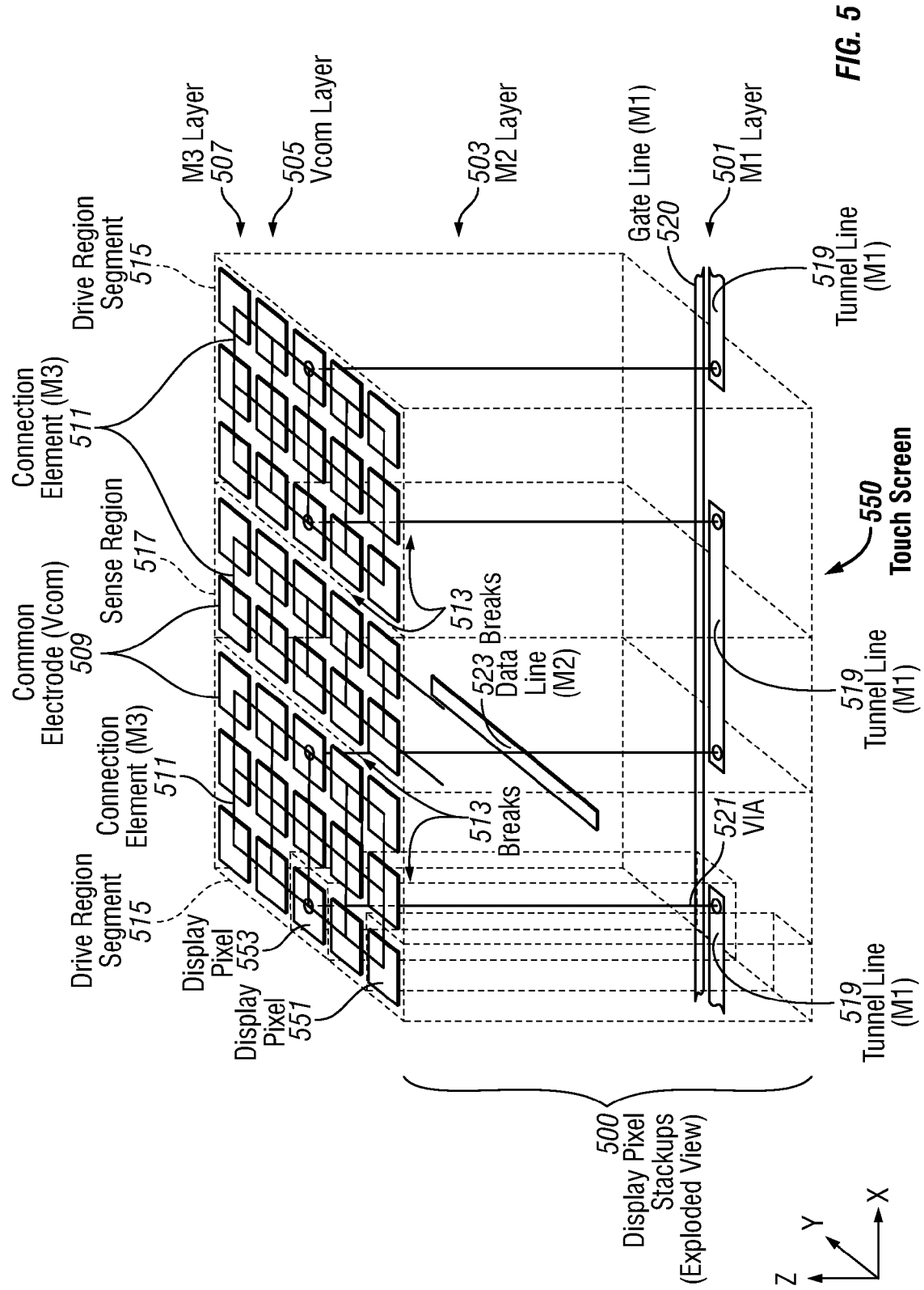
FIG. 5 is a three-dimensional illustration of an exploded view (expanded in the z-direction) of example display pixel stackups showing some of the elements within the pixel stackups of an example integrated touch screen.

FIG. 5 is a three-dimensional illustration of an exploded view (expanded in the z-direction) of example display pixel stackups 500 showing some of the elements within the pixel stackups of an example integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element 511 that can electrically connect together common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect together drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display pixels and multiple data lines running through each vertical row of display pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, gate lines 520 can be held to a fixed voltage while stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected together drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

Figure 6:
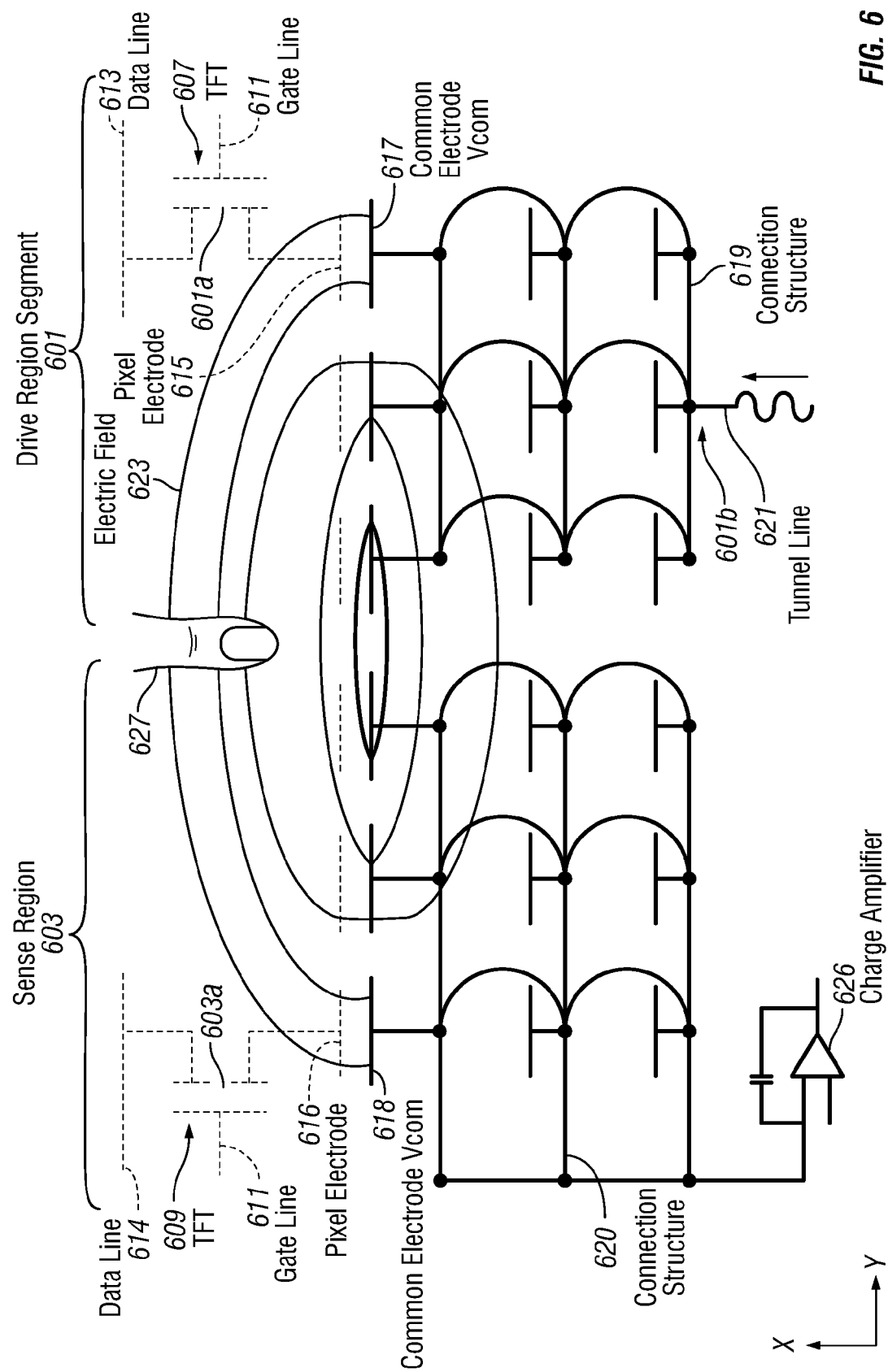
FIG. 6 illustrates an example touch sensing operation according to examples of the disclosure.

A touch sensing operation according to examples of the disclosure will be described with reference to FIG. 6. FIG. 6 shows partial circuit diagrams of some of the touch sensing circuitry within display pixels in a drive region segment 601 and a sense region 603 of an example touch screen according to examples of the disclosure. For the sake of clarity, only one drive region segment is shown. Also for the sake of clarity, FIG. 6 includes circuit elements illustrated with dashed lines to signify some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection element 619 within the display pixels of drive region segment 601 that is used for touch sensing as described in more detail below. Sense region 603 includes a plurality of display pixels including display pixel 603a. Display pixel 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display pixels in sense region 603 through a connection element 620 that can be connected, for example, in a border region of the touch screen to form an element within the display pixels of sense region 603 that is used for touch sensing as described in more detail below.

Although display pixels 601a and 603a have been described as including a single TFT, in some examples the display pixels may include more than a single TFT. For example, display pixel 603a can include two TFTs connected in series, the gate terminals of which both being connected to gate line 611. The same can be true of display pixel 601a and other display pixels in the touch screen. The operation of such display pixels can be substantially the same as the operation of the display pixels of FIG. 6. For ease of description, unless otherwise noted, the examples of the disclosure will be described with reference to the display pixel configuration of FIG. 6, although the scope of the disclosure is not so limited.

During a touch sensing phase, gate line 611 can be connected to a power supply, such as a charge pump, that can apply a voltage to maintain TFTs 609 in the "off" state. Drive signals can be applied to common electrodes 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrodes 618 of sense region 603, which can be connected to a sense amplifier, such as a charge amplifier 626. Electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display pixels of touch screen 550 include different elements than other display pixels. For example, a display pixel 551 can include a portion of connection element 511 that has breaks 513 in the x-direction and the y-direction, and display pixel 551 does not include tunnel line 519. A display pixel 553 can include a portion of connection element 511 that has a break 513 in the x-direction, but not in the y-direction, and can include a portion of tunnel line 519 and a via 521. Other display pixels can include other differences in the configuration of stackup elements including, for example, no breaks 513 in connection element 511, a portion of tunnel line 519 without a via 521, etc.

As described above, in some examples, one or more display pixels in a drive region segment of the touch screen can be electrically connected to the same gate line as one or more display pixels in a sense region of the touch screen. This common connection can result in direct parasitic coupling between the one or more display pixels in the drive and sense regions. During a touch sensing phase of the touch screen, this parasitic coupling can cause unwanted perturbation of touch signals detected by the detection circuitry in the touch screen.

Figure 7:
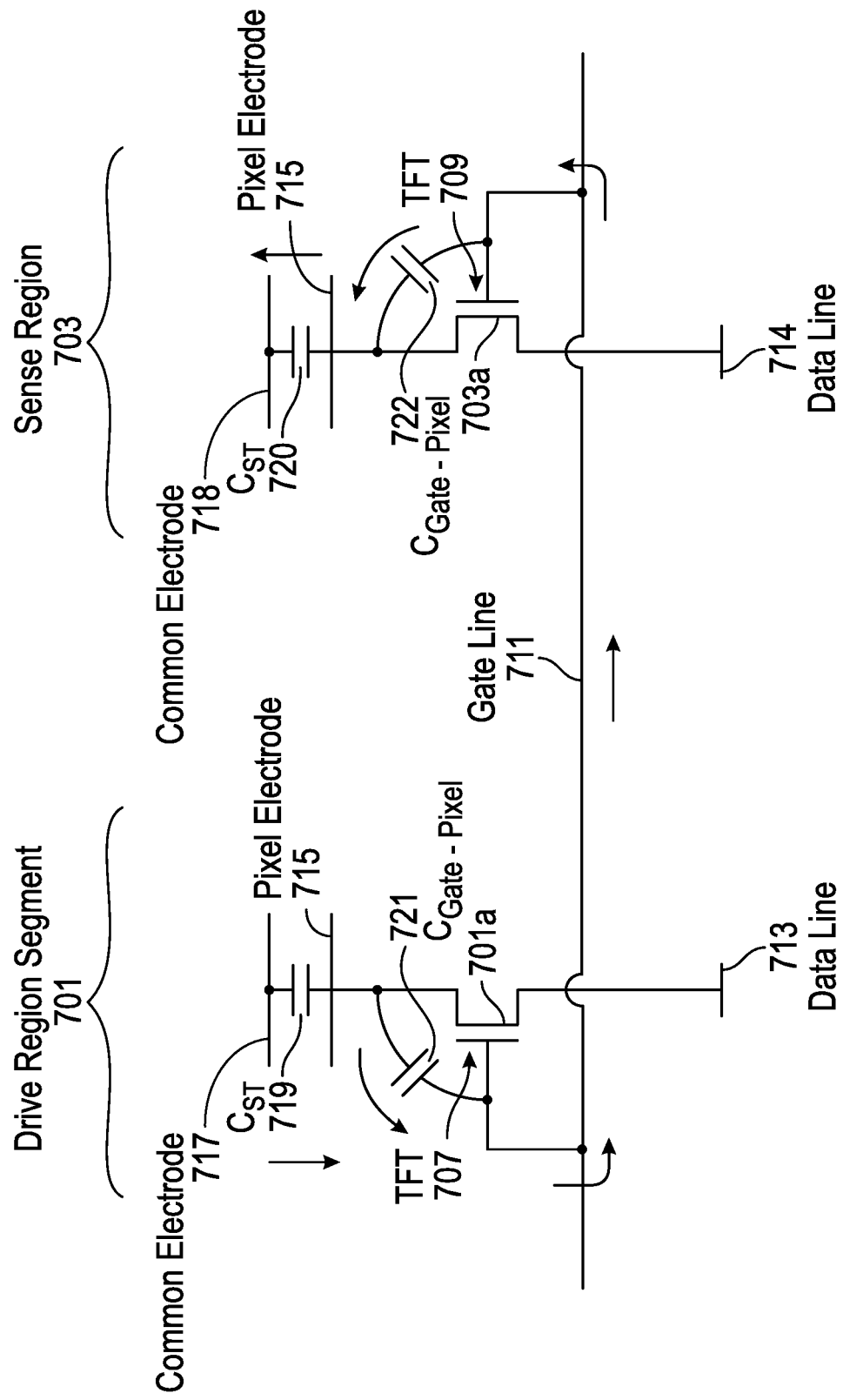
FIG. 7 illustrates an exemplary parasitic coupling pathway between a display pixel in a drive region segment and a display pixel in a sense region of an example touch screen according to examples of the disclosure.

FIG. 7 illustrates an exemplary parasitic coupling pathway between display pixel 701a in drive region segment 701 and display pixel 703a in sense region 703 of an example touch screen according to examples of the disclosure. Display pixels 701a and 703a can have the same structure as display pixels 601a and 603a as described above with reference to FIG. 6. Also as described above, display pixels 701a and 703a can share gate line 711. Gate line 711 can provide a direct pathway through which signals, including noise, can be coupled from common electrode 717 in drive region segment 701 to common electrode 718 in sense region 703. Because touch sensing during a touch sensing phase of the touch screen can be performed by detecting a signal at common electrode 718 in sense region 703, unwanted noise that may be injected into common electrode 718 can result in inaccurate touch measurements.

In particular, the above-mentioned parasitic coupling pathway can originate at common electrode 717. The pathway can continue to pixel electrode 715 through $C_{ST}$ 719, the capacitance between common electrode 717 and the pixel electrode. $C_{ST}$ 719 can be a function of the materials used in the display pixel stackup, and the placement of pixel electrode 715 and common electrode 717 in display pixel 701a. $C_{ST}$ 719 can include a variable component and a constant component. The variable component will be described later. The constant component can be a function of the materials used and the placement of pixel electrode 715 and common electrode 717.

The pathway can proceed from pixel electrode 715 to gate line 711 through $C_{Gate-Pixel}$ 721, the capacitance between the gate and drain terminals of TFT 707. $C_{Gate-Pixel}$ 721 can include a variable component and a constant component. The variable component of $C_{Gate-Pixel}$ 721 will be described later. The constant component of $C_{Gate-Pixel}$ 721 can be a function of the materials used in the display pixel stackup, and the placement of circuit elements such as gate line 711 and pixel electrode 715. The pathway can cross from drive region segment 701 into sense region 703 via gate line 711. Next, the pathway can continue to pixel electrode 716 through $C_{Gate-Pixel}$ 722, the capacitance between the gate and drain terminals of TFT 709. Finally, the pathway can end at common electrode 718 by coupling from pixel electrode 716 to the common electrode through $C_{ST}$ 720, the capacitance between the common electrode and the pixel electrode. A signal that travels through the above-described parasitic pathway and ends up on common electrode 718 can then be sensed during a touch sensing phase of the touch screen, as described above. If this signal does not represent the proximity of a touch object to drive region segment 701 and sense region 703 (i.e., the signal is noise), the signal could adversely affect the accurate measurement of touch on the touch screen.

The above-described parasitic coupling pathway can be especially problematic in some examples because $C_{ST}$ 719, $C_{ST}$ 720, $C_{Gate-Pixel}$ 721 and $C_{Gate-Pixel}$ 722 can be image grey level dependent. In other words, these capacitances through which the coupling pathway can exist can be variable, and can vary with the image displayed on the touch screen. Such variability can make it difficult to properly operate the touch screen.

It is noted that although the parasitic coupling pathway has been described as starting at common electrode 717, noise or other unwanted signals from any point in display pixel 701a can be coupled to display pixel 703a via gate line 711. Any such signals can prove problematic for proper touch screen operation.

The variability of $C_{Gate-Pixel}$ 721 will now be described with reference to display pixel 701a in FIG. 7. This description can similarly apply to display pixel 703a as well as any other display pixels in the touch screen according to examples of the disclosure. During a display phase of the touch screen, gate line 711 can be set to a voltage such that TFT 707 can be on. In some examples, this voltage can be a high voltage, and can be denoted by VGH. The following examples of the disclosure will be described as utilizing a high gate voltage to turn on the TFTs in display pixels. However, it is understood that the TFTs can be of the type such that a low gate voltage can turn them on.

As a result of TFT 707 being turned on, the voltage at data line 713 can be substantially transferred to pixel electrode 715. The voltage difference between pixel electrode 715 and common electrode 717 can determine the grey level of display pixel 701a. The voltage at data line 713 (and thus the voltage at pixel electrode 715) and the voltage at common electrode 717 can therefore be set to achieve the desired grey level for display pixel 701a.

It is noted that it can be the magnitude, and not the sign, of the voltage difference between pixel electrode 715 and common electrode 717 that can determine the grey level of display pixel 701a. For example, a voltage difference of +5V between pixel electrode 715 and common electrode 717 (i.e., the voltage at the pixel electrode being 5V higher than the voltage at the common electrode) can provide the same grey level for display pixel 701a as a voltage difference of −5V between those same electrodes (i.e., the voltage at the pixel electrode being 5V lower than the voltage at the common electrode). Therefore, in some examples of the disclosure, the voltage supplied to pixel electrode 715 with respect to the voltage at common electrode 717 may regularly alternate from negative to positive and back again during normal touch screen operation.

When the voltage from data line 713 has been transferred to pixel electrode 715, the voltage at gate line 711 can be set such that TFT 707 can be turned off, and the voltage at the pixel electrode can be substantially maintained. As stated above, the gate voltage needed to turn off TFT 707 can be a low voltage, and can be denoted by VGL. However, this need not be the case in all examples, as noted above. Regardless, the following examples of the disclosure will be described as utilizing a low gate voltage to turn off the TFTs in display pixels. It is understood that the TFTs can be of the type such that a high gate voltage can turn them off.

During a touch sensing phase of the touch screen, the voltages of the touch circuitry can be shifted higher to facilitate proper touch sensing operation. In some examples, this shift can entail increasing the voltage at common electrode 717. In order to keep the grey level of display pixel 701a constant during the above-mentioned shift, the voltage at pixel electrode 715 can also be shifted up by the same amount as common electrode 717 to maintain the voltage difference between the two electrodes during the transition. However, the voltage at gate line 711 can remain at VGL to ensure that TFT 707 can remain turned off. Therefore, during a touch sensing phase of the touch screen, the voltage difference between gate line 711 and pixel electrode 715 can change from the voltage difference that exists between the gate line and the pixel electrode during a display phase of the touch screen.

The above-described change in voltage difference can affect the value of $C_{Gate-Pixel}$ 721. As described above, $C_{Gate-Pixel}$ 721 can include the gate-to-drain capacitance of TFT 707. This gate-to-drain capacitance of TFT 707 can vary with the voltage difference between the gate and drain terminals of the TFT because of the characteristics and design of transistors such as TFT 707. Therefore, because the voltage between pixel electrode 715 and gate line 711 can change when the touch screen transitions from a display phase to a touch sensing phase, as described above, $C_{Gate-Pixel}$ 721 can change during that same transition, thus making $C_{Gate-Pixel}$ variable.

Further adding to the variability of $C_{Gate-Pixel}$ 721 can be the fact that the voltage at pixel electrode 715 can vary based on the desired grey level of display pixel 701a, as described above. This can in turn result in the voltage difference between pixel electrode 715 and gate line 711 varying based on the grey level of display pixel 701a, which can then cause further variance in $C_{Gate-Pixel}$ 721. $C_{Gate-Pixel}$ 721 can therefore be image grey level dependent.

Figure 8:
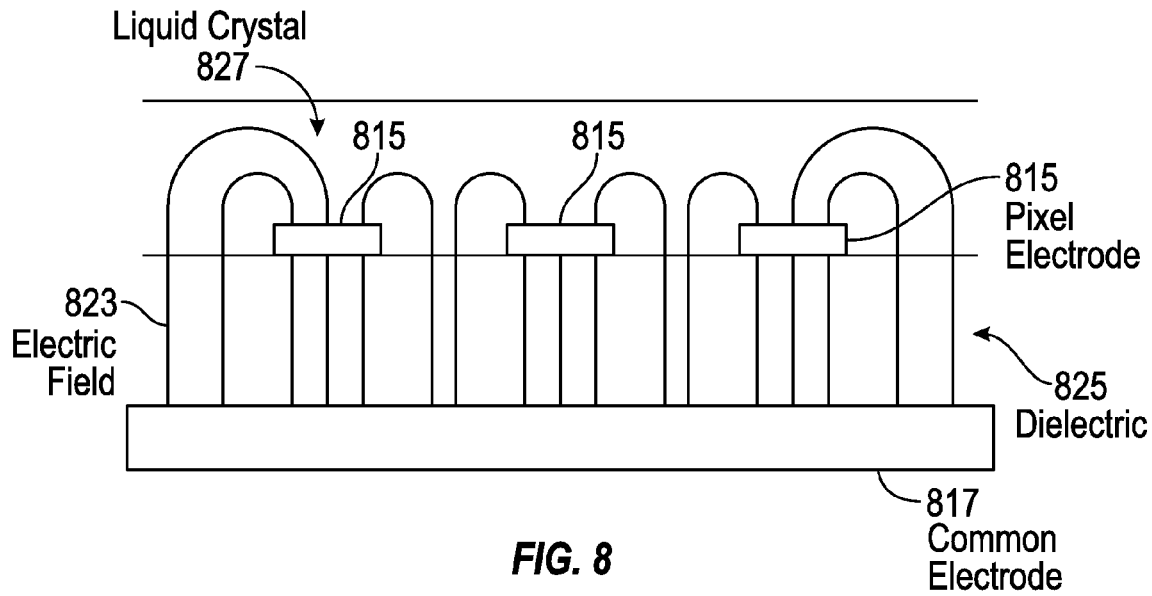
FIG. 8 illustrates the variability of $C_{ST}$ in a display pixel.

In addition to the variability of $C_{Gate-Pixel}$ 721, $C_{ST}$ 719, which can also be included in the parasitic capacitive coupling pathway between display pixels, can also be variable. The variability of $C_{ST}$ 719 in display pixel 701a will now be described with reference to FIG. 8. The following description can similarly apply to $C_{ST}$ 720 in display pixel 703a as well as other corresponding capacitances in other display pixels in the touch screen according to examples of the disclosure. FIG. 8 illustrates an exemplary partial material stackup of a display pixel of the touch screen according to examples of the disclosure. Common electrode 817 and pixel electrode 815 can be separated by dielectric 825. Common electrode 817 and pixel electrode 815 can, for example, correspond to common electrode 717 and pixel electrode 715, respectively. Liquid crystal 827 can be formed over pixel electrode 815.

As described above, a voltage difference can exist between pixel electrode 815 and common electrode 817 depending on the desired grey level of the display pixel in which they reside. This voltage difference can generate an electric field 823 between pixel electrode 815 and common electrode 817. Electric field 823 can exist in both liquid crystal 827 and dielectric 825. Therefore, the capacitance between pixel electrode 815 and common electrode 817, which can be represented by $C_{ST}$ 719, can be a function of the dielectric constants of both liquid crystal 827 and dielectric 825. However, in some examples, the dielectric constant of liquid crystal 827 can change as a function of the electric fields 823 that penetrate it, and the electric fields can change as a function of the voltage difference between pixel electrode 815 and common electrode 817. Therefore, the capacitance between pixel electrode 815 and common electrode 817, which can be represented by $C_{ST}$ 719, can change as a function of the voltage difference between the pixel electrode and the common electrode. Because this voltage difference can set the grey level of the corresponding display pixel, as described above, $C_{ST}$ 719 can be image grey level dependent.

Figure 9:
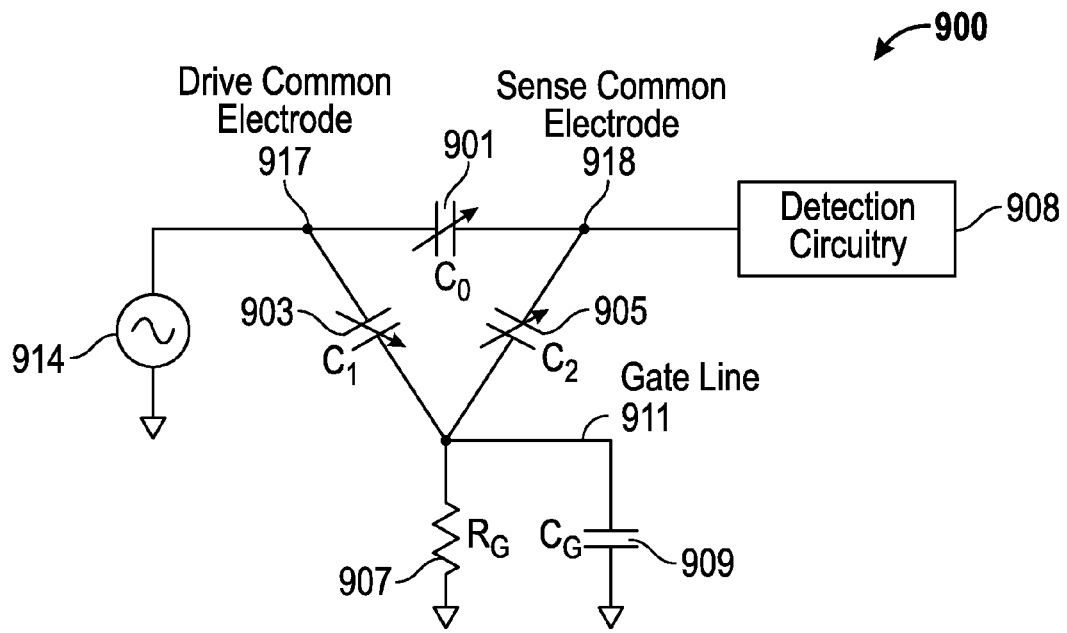
FIG. 9 illustrates an example equivalent touch sensing circuit with a variable parasitic capacitive coupling pathway according to examples of the disclosure.

FIG. 9 illustrates an example equivalent touch sensing circuit 900 with a variable parasitic capacitive coupling pathway according to examples of the disclosure. Touch sensing circuit 900 can include a drive common electrode 917 that can be stimulated by a stimulation voltage source 914. Sense common electrode 918 can be located proximate to drive common electrode 917 such that charge on the drive common electrode provided by stimulation voltage source 914 can be partially coupled onto the sense common electrode via capacitive pathway $C_0$ 901. As discussed above, the amount of charge coupled onto sense common electrode 918 from drive common electrode 917 can vary depending on the proximity of a finger or a touch object to the drive and sense common electrodes. The charge coupled onto sense common electrode 918 can then be detected by detection circuitry 908, which can detect the changes in the mutual capacitance $C_0$ 901 between drive common electrode 917 and the sense common electrode.

As described above, a variable parasitic capacitive coupling pathway can exist between drive common electrode 917 and sense common electrode 918 via gate line 911. This pathway can begin at drive common electrode 917 and can reach gate line 911 via $C_1$ 903. $C_1$ 903 can include the series combination of $C_{ST}$ 719 and $C_{Gate\text{-}Pixel}$ 721, both of which can be variable as described above. The pathway can continue to sense common electrode 918 via $C_2$ 905. $C_2$ 905 can include the series combination of $C_{ST}$ 720 and $C_{Gate\text{-}Pixel}$ 722, both of which can also be variable as described above. This parasitic capacitive coupling pathway can provide for additional coupling of charge onto sense common electrode 918, which can then be detected by detection circuitry 908, and can hamper touch sensing detection.

$R_G$ 907 can represent the effective resistance of gate line 911, and can be a product of the metal used to create the gate line, for example. $C_G$ 909 can represent the effective capacitance of gate line 911, and can be a combination of various capacitances created by elements in the touch screen such as data lines, pixel electrodes and common electrodes, as discussed above.

In the circuit 900 of FIG. 9, the signal coupling from drive common electrode 917 to sense common electrode 918 due to the parasitic pathway can be characterized by the following equation:

$$R_G * (C_1 * \Delta C_2 + C_2 * \Delta C_1)/(1+\tau) \quad (1)$$

wherein $\tau$ can represent the RC time constant of the parasitic pathway. As described above, $C_1$ 903 can include a constant component and a variable component, and can be represented by the equation:

$$C_{1c} + C_{1v} \quad (2)$$

wherein $C_{1c}$ can represent the constant component of $C_1$ and $C_{1v}$ can represent the variable component of $C_1$. $C_2$ 905 can also include a constant component and a variable component, and can be represented by the equation:

$$C_{2c} + C_{2v} \quad (3)$$

wherein $C_{2c}$ can represent the constant component of $C_2$ and $C_{2v}$ can represent the variable component of $C_2$.

The effect of the variable parasitic capacitive coupling pathway discussed above can be reduced by severing, to various degrees, the parasitic pathway from drive common electrode 917 to sense common electrode 918 through $C_1$ 903, gate line 911 and $C_2$ 905.

Figure 10A:
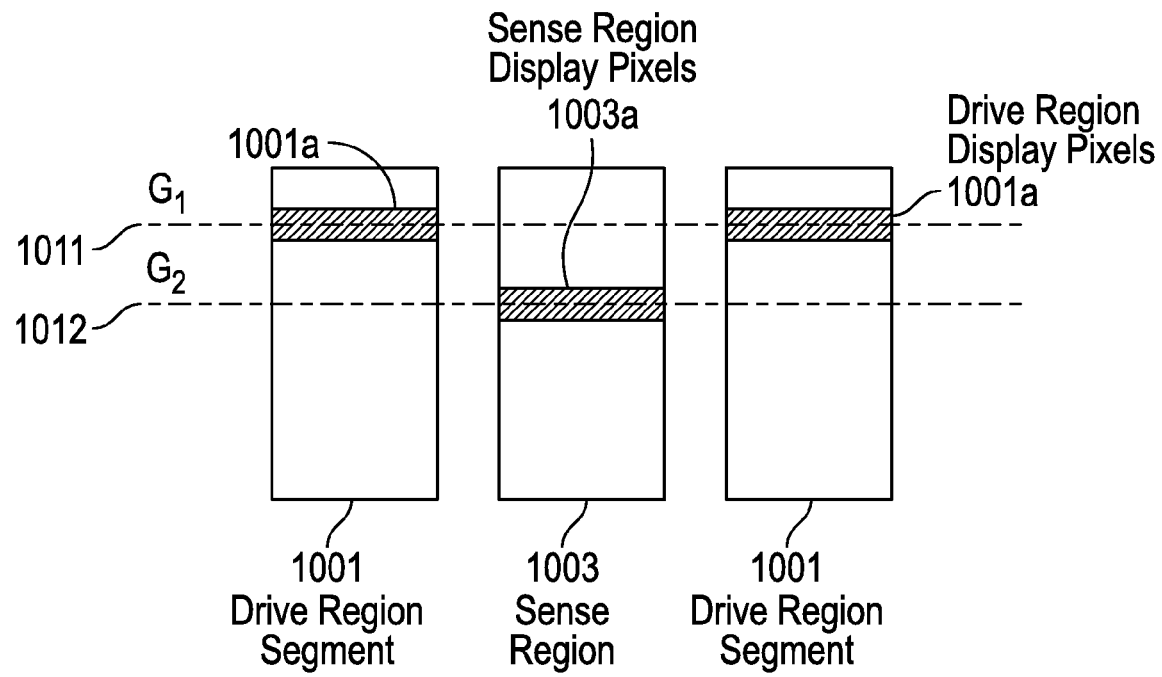
FIG. 10A illustrates an example configuration in which gate lines of display pixels in drive region segments can be different than gate lines of display pixels in sense regions.

One way to sever the parasitic pathway can be to eliminate the common gate line connecting display pixels in drive and sense regions of the touch screen. FIG. 10A illustrates an example configuration in which gate lines of display pixels in drive region segments 1001 can be different than gate lines of display pixels in sense regions 1003. $G_1$ 1011 can be a gate line that is electrically connected to the gate terminals of TFTs in drive region display pixels 1001a in drive region segments 1001. $G_2$ 1012 can be a gate line that is electrically connected to the gate terminals of TFTs in sense region display pixels 1003a in sense region 1003. $G_1$ 1011 can pass through sense region 1003 without being electrically connected to display pixels in the sense region. Similarly, $G_2$ 1012 can pass through drive region segments 1001 without being electrically connected to display pixels in the drive region segments. In this way, the direct coupling between display pixels in drive and sense regions via a gate line that connects them, as described with reference to FIG. 7, can be removed. In other words, in the configuration of FIG. 10A, no direct electrical connection can exist between display pixels 1001a in drive region segments 1001 and display pixels 1003a in sense region 1003.

Figure 10B:
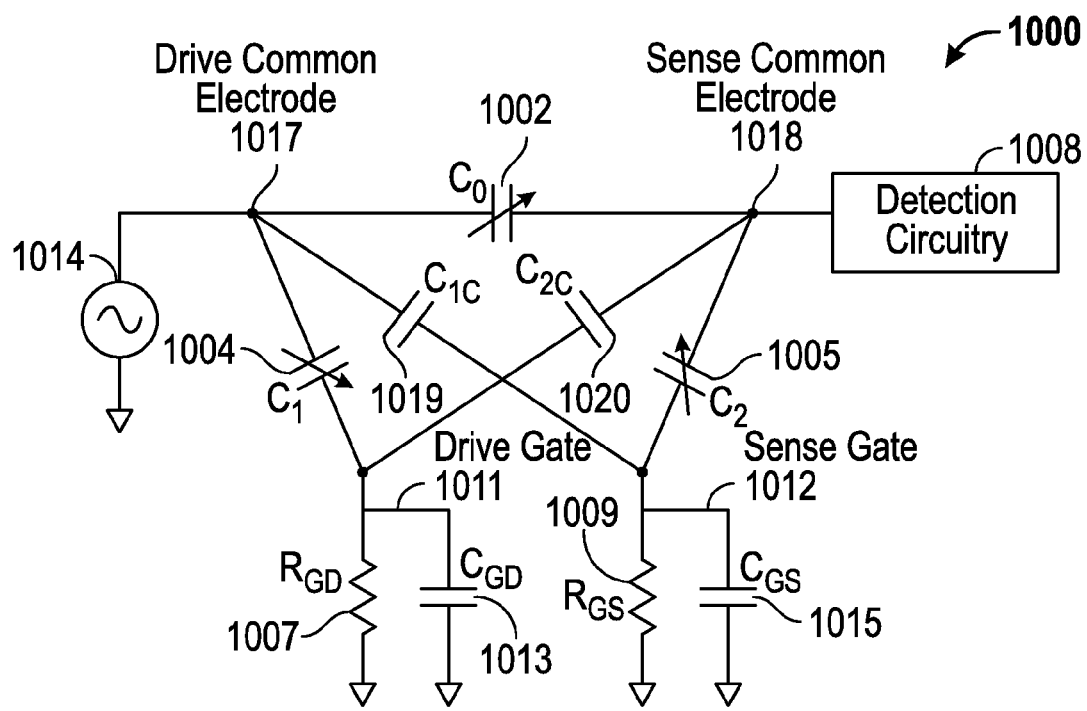
FIG. 10B illustrates an example equivalent touch sensing circuit with variable parasitic capacitive coupling between a display pixel in a drive region and a display pixel in a sense region when the two display pixels are connected to different gate lines.

FIG. 10B illustrates an example equivalent touch sensing circuit 1000 with variable parasitic capacitive coupling between a display pixel in a drive region and a display pixel in a sense region when the two display pixels are connected to different gate lines. The configuration of touch sensing circuit 1000 can be similar to that of touch sensing circuit 900, with some differences. Drive common electrode 1017 can be coupled to drive gate 1011 via $C_1$ 1004. Sense common electrode 1018 can be coupled to sense gate 1012 via $C_2$ 1005. $C_1$ 1004 and $C_2$ 1005 can be substantially similar to $C_1$ 903 and $C_2$ 905. However, drive common electrode 1017 can also be coupled to sense gate 1012 via $C_{1C}$ 1019. $C_{1C}$ 1019 can be a function of the positioning of sense gate 1012 passing underneath drive common electrode 1017, as described in FIG. 10A, and can be constant. Similarly, sense common electrode 1018 can also be coupled to drive gate 1011 via $C_{2C}$ 1020. $C_{2C}$ 1020 can similarly be a function of the positioning of drive gate 1011 passing underneath sense common electrode 1018, as described in FIG. 10A, and can be constant. Two parasitic pathways can now exist between drive common electrode 1017 and sense common electrode 1018: one through $C_1$ 1004 and $C_{2C}$ 1020 via drive gate 1011, and one through $C_{1C}$ 1019 and $C_2$ 1005 via sense gate 1012.

$R_{GD}$ 1007 can represent the effective resistance of drive gate 1011, and can be a product of the metal used to create the gate line, for example. $C_{GD}$ 1013 can represent the effective capacitance of drive gate 1011, and can be a combination of various capacitances created by elements in the touch screen such as data lines, pixel electrodes and common electrodes, as discussed above. Similarly, $R_{GS}$ 1009 can represent the effective resistance of sense gate 1012, and can be a product of the metal used to create the gate line, for example. $C_{GS}$ 1015 can represent the effective capacitance of sense gate 1012, and can be a combination of various capacitances created by elements in the touch screen such as data lines, pixel electrodes and common electrodes, as discussed above.

Although two parasitic pathways can exist between drive common electrode 1017 and sense common electrode 1018, the effects from the variable components of $C_1$ 1004 and $C_2$ 1005 can be reduced. In particular, in the circuit 1000 of FIG. 10B, the signal coupling from drive common electrode 1017 to sense common electrode 1018 due to the parasitic pathways can be characterized by the following equation:

$$R^*(C_{1C}{}^*\Delta C_2 + C_{2C}{}^*\Delta C_1)/(1+\tau) \quad (4)$$

wherein $\tau$ can represent the RC time constant of the parasitic pathways. If $R_{GD}$ 1007≈$R_{GS}$ 1009≈$R_G$ 907, R can be approximately equal to $R_{GD}$, $R_{GS}$ and $R_G$. $C_1$ and $C_2$ can be as described in equations (2) and (3). Comparing equation (4) to equation (1), it is apparent that the variable signal coupling between drive common electrode 1017 and sense common electrode 1018 in the configuration of FIG. 10B can be less than that of the configuration of FIG. 9. Specifically, $\Delta C_1$ and $\Delta C_2$ in equation (4) can be multiplied by $C_{2C}$ and $C_{1C}$, respectively, both of which can be constant. In contrast, in equation (1), $\Delta C_1$ and $\Delta C_2$ were multiplied by $C_2$ and $C_1$, respectively, both of which can be variable. Accordingly, as long as $R \approx R_{GD} \approx R_{GS} \approx R_G$, the variable component of the parasitic coupling can be reduced as shown.

In the examples described above, display pixels in drive regions have been decoupled from display pixels in sense regions by permanently eliminating gate lines that can be shared between the two sets of display pixels. As an alternative to permanently decoupling the shared gate lines, the shared gate lines can be decoupled only during a touch sensing phase of the touch screen of the disclosure. The touch sensing phase can be a time during which noise injection into the sense region can cause inaccurate detection of touch signals.

Figure 11A:
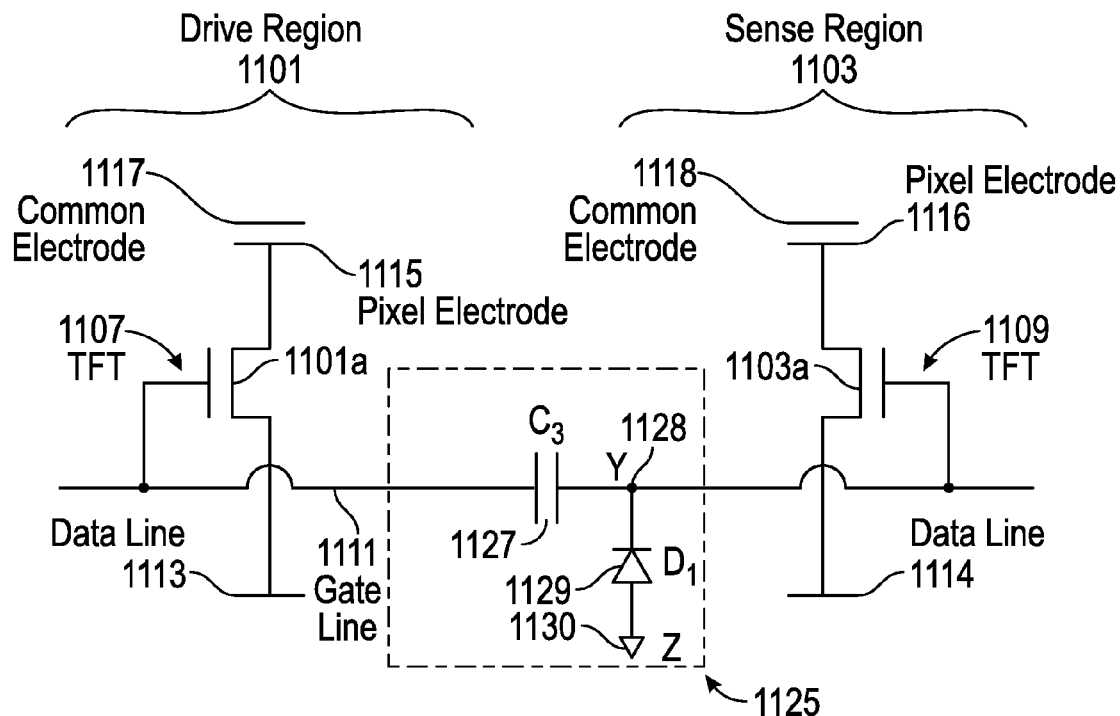
FIG. 11A illustrates an example configuration in which a gate line that connects display pixels in the drive and sense regions can be decoupled during a touch sensing phase of the touch screen according to examples of the disclosure.

FIG. 11A illustrates an example configuration in which a gate line 1111 that connects display pixels 1101*a* and 1103*a* in the drive 1101 and sense regions 1103 can be decoupled during a touch sensing phase of the touch screen according to examples of the disclosure. The general configuration of display pixels 1101*a* and 1103*a* can be that of FIG. 7. As in FIG. 7, display pixels 1101*a* and 1103*a* can be connected by gate line 1111. However, in the configuration of FIG. 11A, gate line 1111 can include capacitor $C_3$ 1127 and diode $D_1$ 1129 in region 1125, connected as shown. Region 1125 can be a portion of gate line 1111 that can exist between display pixels at the boundaries of adjacent drive 1101 and sense regions 1103. In other words, region 1125 need not exist in portions of gate line 1111 that connect display pixels within the same drive 1101 or sense region 1103. Rather, region 1125 can exist only in portions of gate line 1111 that connect display pixels in different regions, e.g., a display pixel 1101*a* in drive region 1101 and a display pixel 1103*a* in sense region 1103. In this way, as will be described below, the configuration of FIG. 11A can decouple gate line 1111 in drive region 1101 from the gate line in sense region 1103 during a touch sensing phase of the touch screen.

The operation of the components inside region 1125 will now be described. As stated above, region 1125 of gate line 1111 can include $C_3$ 1127 and $D_1$ 1129, connected as shown. During a touch sensing phase of the touch screen, the voltage at gate line 1111 in drive region 1101 can be set to VGL, which can be a DC voltage. Because the voltage at gate line 1111 can be a DC voltage, $C_3$ 1127 can act substantially like an open circuit. In that case, voltage signals from drive region 1101 can be blocked from being transmitted to sense region 1103 via gate line 1111 during a touch sensing phase of the touch screen. Further, the voltage at node Z 1130 can be set such that when the voltage at gate line 1111 is set to VGL, $D_1$ 1129 can act as a sink to take signal noise on gate line 1111 in sense region 1103 to node Z 1130. Further, the voltage at node Z 1130 can be set such that the voltage that transfers to node Y 1128 via $D_1$ 1129 can be substantially VGL, which can maintain TFT 1109 in an off state.

During a transition of the touch screen from the touch sensing phase to a display phase, the voltage at gate line 1111 in drive region 1101 can transition from VGL, a low voltage, to VGH, a high voltage. Because the voltage at gate line 1111 during this transition is no longer a DC voltage, $C_3$ 1127 can act substantially as a closed circuit and can couple the voltage at the gate line in drive region 1101 to the gate line in sense region 1103, thus providing TFT 1109 a gate voltage sufficient to turn the TFT on. In some examples, the time during which the voltage at gate line 1111 can be high can be short enough such that the coupling of the voltage from drive region 1101 to sense region 1103 via $C_3$ 1127 can be sufficient to maintain the high voltage at the gate line in the sense region.

Accordingly, as described above, during a touch sensing phase of the touch screen, gate line 1111 in drive region 1101 can be decoupled from the gate line in sense region 1103, thus at least partially severing the parasitic coupling pathway between the drive region and the sense region. During a transition to a display phase of the touch screen, gate line 1111 in drive region 1101 and the gate line in sense region 1103 can remain substantially coupled to allow for proper touch screen operation.

Figure 11B:
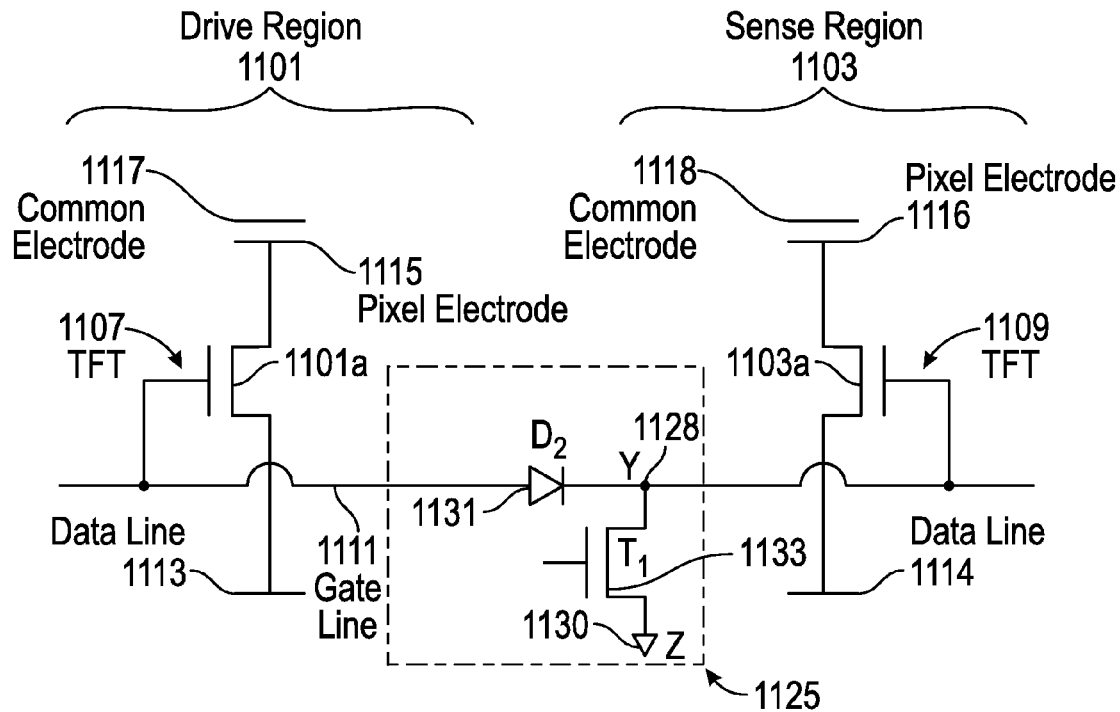
FIG. 11B illustrates another example configuration in which a gate line that connects display pixels in the drive and sense regions can be decoupled during a touch sensing phase of the touch screen according to examples of the disclosure.

FIG. 11B illustrates another example configuration in which a gate line 1111 that connects display pixels 1101*a* and 1103*a* in the drive 1101 and sense regions 1103 can be decoupled during a touch sensing phase of the touch screen according to examples of the disclosure. The configuration of FIG. 11B can be substantially that of FIG. 11A, except that region 1125 can instead include diode $D_2$ 1131 and TFT $T_1$ 1133 connected as shown. During a touch sensing phase of the touch screen, gate line 1111 in drive region 1101 can be set to VGL such that TFT 1107 can be off. $T_1$ 1133 can be turned on to pull the voltage at node Y 1128 to the voltage at node Z 1130. The voltage at node Z 1130 can be set such that the voltage at node Y 1128, and thus the voltage at the gate of TFT 1109, can be low enough to turn off TFT 1109. For example, the voltage at node Z 1130 can be substantially VGL. Voltage noise signals at gate line 1111 in drive region 1101 can be blocked from traveling to the gate line in sense region 1103 by $D_2$ 1131, because $D_2$ can have a non-zero turn-on voltage. Additionally or alternatively, voltage noise signals that appear at node Y 1128 can be shunted to node Z 1130 via $T_1$ 1133 instead of being allowed to travel to the gate of TFT 1109.

During a display phase of the touch screen, $T_1$ 1133 can be turned off. The voltage at the gate line 1111 in drive region 1101 can be substantially coupled by $D_2$ 1131 to the gate line in sense region 1103. The voltage at gate line 1111 can be VGH such that TFTs 1107 and 1109 can be turned on, which can allow for proper touch screen operation during the display phase.

Figure 11C:
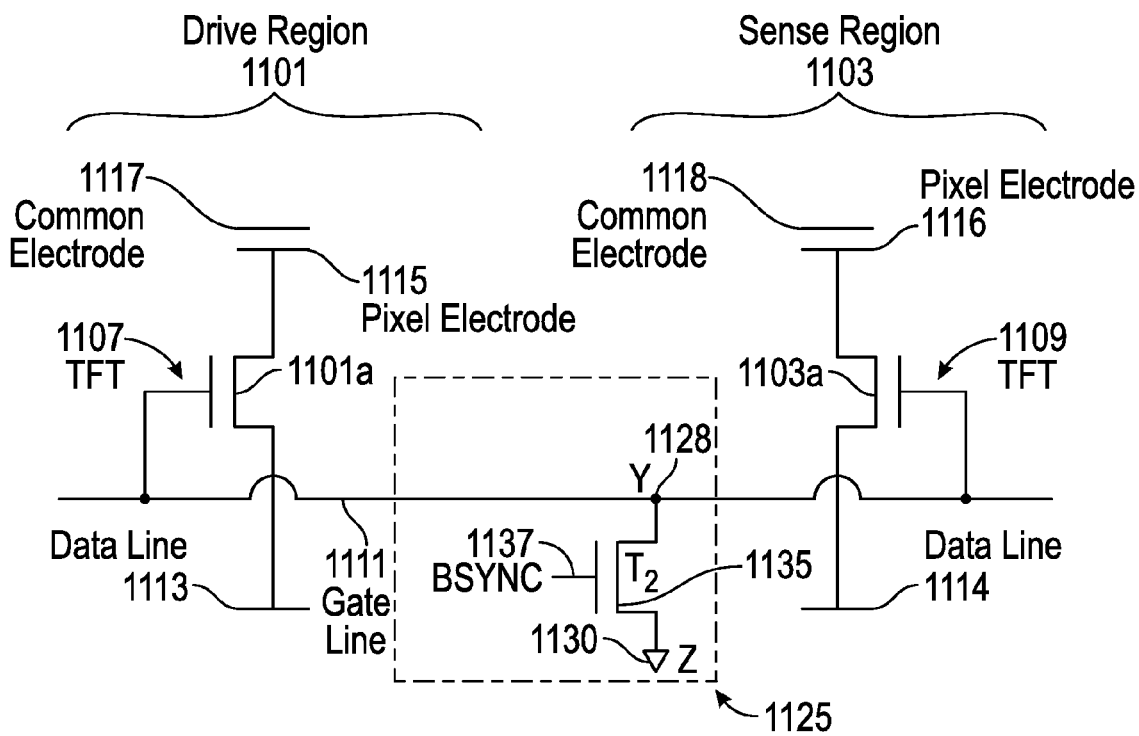
FIG. 11C illustrates another example configuration in which a gate line that connects display pixels in the drive and sense regions can be decoupled during a touch sensing phase of the touch screen according to examples of the disclosure.

FIG. 11C illustrates another example configuration in which a gate line 1111 that connects display pixels 1101*a* and 1103*a* in the drive 1101 and sense regions 1103 can be decoupled during a touch sensing phase of the touch screen according to examples of the disclosure. The configuration of FIG. 11C can be substantially that of FIG. 11A, except that region 1125 can include TFT T$_2$ 1135 connected to gate line 1111 as shown. The gate terminal of T$_2$ 1135 can be electrically connected to signal BSYNC 1137. BSYNC 1137 can be a timing signal used synchronize operation of the touch screen, and can be low to signify a display phase and can be high to signify a touch sensing phase of the touch screen.

Therefore, during a touch sensing phase, BSYNC 1137 can be high, which can mean that T$_2$ 1135 can be turned on. Turning T$_2$ 1135 on can pull the voltage at node Y 1128 to the voltage at node Z 1130. The voltage at node Z 1130 can be set such that the resulting voltage at node Y 1128, and thus the voltage at the gate of TFT 1109, can be low enough to turn off TFT 1109. For example, the voltage at node Z 1130 can be substantially VGL. As a result of T$_2$ 1135 being on, voltage noise signals at gate line 1111 in drive region 1101 can be shunted to node Z 1130 via T$_2$, and can thus be prevented from travelling to the gate of TFT 1109.

During a display phase of the touch screen, BSYNC 1137 can be low, which can mean that T$_2$ 1135 can be turned off. When T$_2$ 1135 is off, gate line 1111 can couple drive region 1101 and sense region 1103 in the manner described with reference to FIG. 7, and touch screen operation can proceed as usual.

Figure 11D:
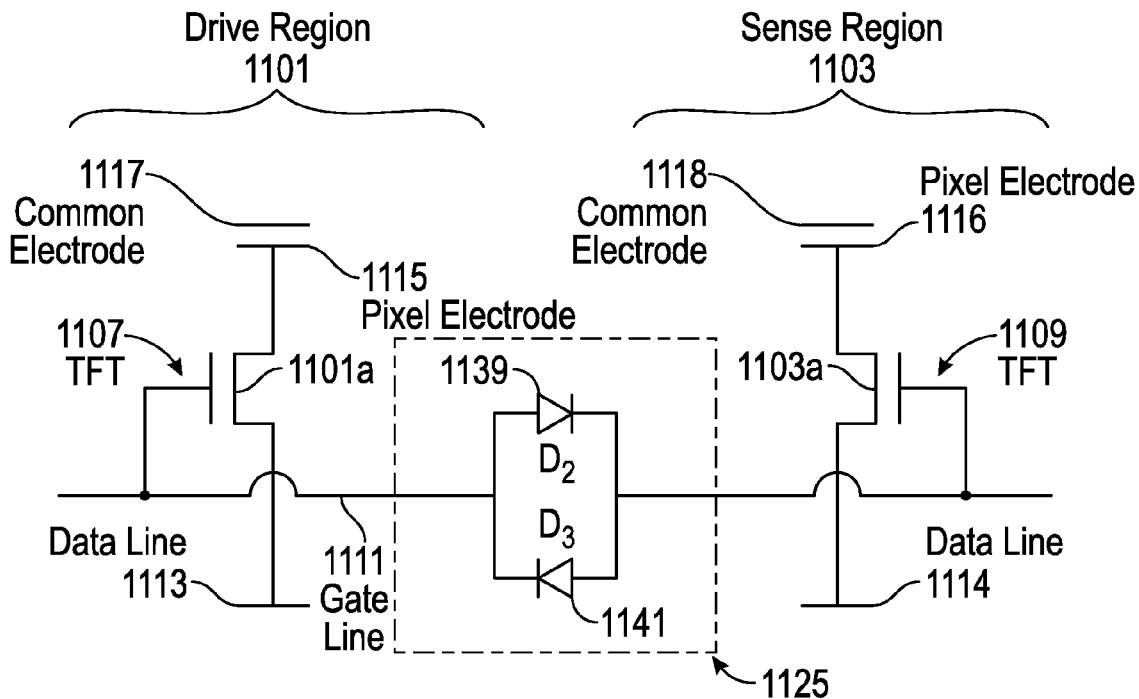
FIG. 11D illustrates another example configuration in which a gate line that connects display pixels in the drive and sense regions can be decoupled during a touch sensing phase of the touch screen according to examples of the disclosure.

FIG. 11D illustrates another example configuration in which a gate line 1111 that connects display pixels 1101a and 1103a in the drive 1101 and sense regions 1103 can be decoupled during a touch sensing phase of the touch screen according to examples of the disclosure. The configuration of FIG. 11D can be substantially that of FIG. 11A, except that region 1125 can include diodes D$_2$ 1139 and D$_3$ 1141 connected in a diode ring configuration as shown. The diode ring configuration in region 1125 can prevent small variations in voltage (i.e., voltage noise) from being transmitted from gate line 1111 in drive region 1101 to the gate line in sense region 1103. However, the diode ring configuration in region 1125 can allow for larger variations in voltage to be transmitted through it.

For example, during a touch sensing phase of the touch screen, the voltage at gate line 1111 can be VGL and DC, as described above. Voltage noise signals in gate line 1111 in drive region 1101 whose magnitudes are less than the turn on voltage of D$_2$ 1139 can be blocked from travelling to the gate line in sense region 1103. Similarly, voltage noise signals in gate line 1111 in sense region 1103 whose magnitudes are less than the turn on voltage of D$_3$ 1141 can be blocked from travelling to the gate line in drive region 1101.

However, during a transition from the touch sensing phase to a display phase, the voltage at gate line 1111 in drive region 1101 can change from VGL to VGH. This change in voltage can be larger than the turn on voltage of D$_2$ 1139. Therefore, the voltage at gate line 1111 in drive region 1101 can be substantially transferred to the gate line in sense region 1103, and can thus be mirrored at the gate of TFT 1109. During a transition from the display phase back to the touch sensing phase, the voltage at gate line 1111 in drive region 1101 can change from VGH to VGL. This change in voltage can be larger than the turn on voltage of D$_3$ 1141. Therefore, the voltage at gate line 1111 in sense region 1103 can be substantially pulled down to VGL via D$_3$ 1141.

Figure 11E:
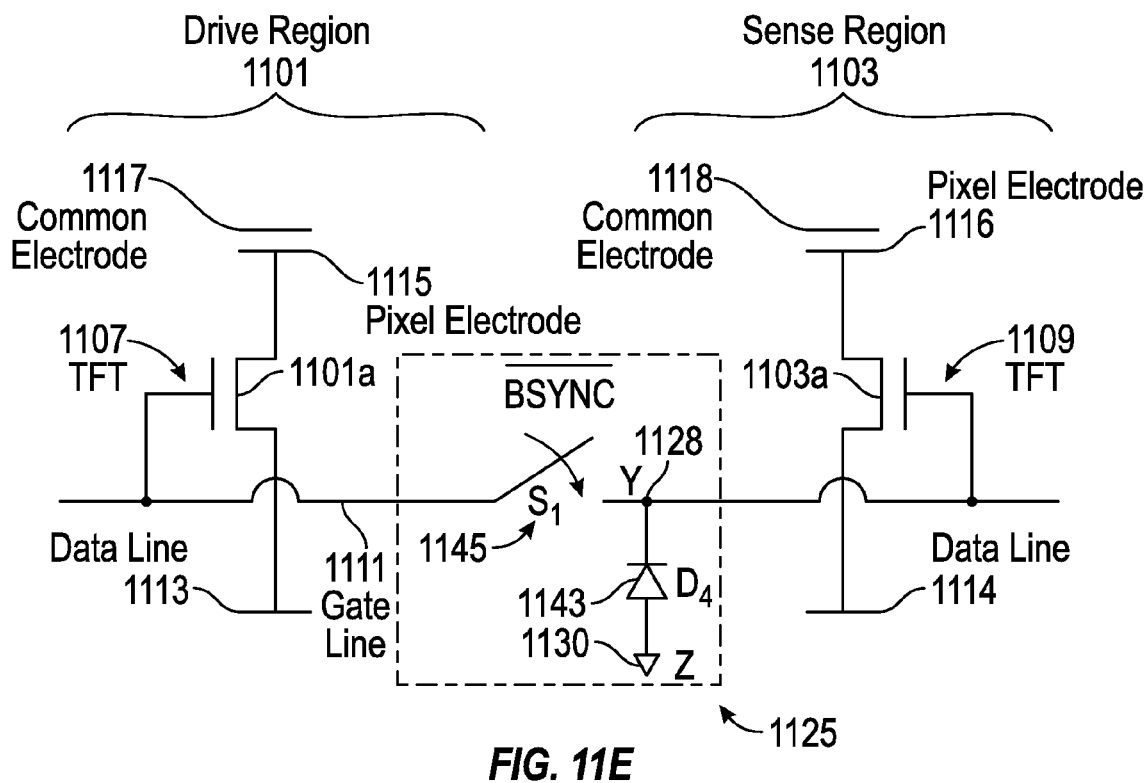
FIG. 11E illustrates another example configuration in which a gate line that connects display pixels in the drive and sense regions can be decoupled during a touch sensing phase of the touch screen according to examples of the disclosure.

FIG. 11E illustrates another example configuration in which a gate line 1111 that connects display pixels 1101a and 1103a in the drive 1101 and sense regions 1103 can be decoupled during a touch sensing phase of the touch screen according to examples of the disclosure. The configuration of FIG. 11E can be substantially that of FIG. 11A, except that region 1125 can include switch S$_1$ 1145 and diode D$_4$ 1143 connected as shown. S$_1$ 1145 can be any number of suitable electrical switches, such as a transmission gate. S$_1$ 1145 can be controlled by signal BSYNC such that when BSYNC is low, S$_1$ can be closed, and when BSYNC is high, S$_1$ can be open. BSYNC can be a timing signal as described above.

During a touch sensing phase, BSYNC can be high, and S$_1$ 1145 can be open. D$_4$ 1143 can act as a sink to maintain the voltage at node Y 1128 at substantially the voltage at node Z 1130. The voltage at node Z 1130 can be set such that the resulting voltage at node Y 1128 can be sufficient to maintain TFT 1109 in an off state. For example, the voltage at node Z 1130 can be substantially VGL. Further, voltage noise signals that appear at node Y 1128 can be shunted to node Z 1130 via D$_4$ 1143.

During a display phase, BSYNC can be low, and S$_1$ 1145 can be closed. Further, the voltage at gate line 1111 can be VGH. Because S$_1$ 1145 can be closed, the voltage at gate line 1111 in drive region 1101 can be substantially coupled to node Y 1128. The voltage at node Y 1128 can be higher than the voltage at node Z 1130, which can result in D$_4$ 1143 being reverse-biased. Therefore, D$_4$ 1143 can act as an open circuit. For example, the voltage at gate line 1111, and thus the voltage at node Y 1128, can be VGH, and the voltage at node Z 1130 can be substantially VGL. Accordingly, the voltage at node Y 1128 can be transmitted to the gate of TFT 1109.

The configurations described above aim to decouple the display pixels in drive regions from display pixels in sense regions, whether permanently or during at least a touch sensing phase of the touch screen. In this way, the combination of C$_{ST}$ 719 and C$_{Gate-Pixel}$ 721, and/or the combination of C$_{ST}$ 720 and C$_{Gate-Pixel}$ 722, as described with reference to FIG. 7, can be at least partially removed from the parasitic coupling pathway between the drive and sense regions during a touch sensing phase of the touch screen.

In some examples, C$_{Gate-Pixel}$ 721 and 722 can be the dominant coupling mechanisms between the drive and sense regions of the touch screen. Therefore, it can be desirable to reduce the coupling effects of these capacitances.

Figure 12:
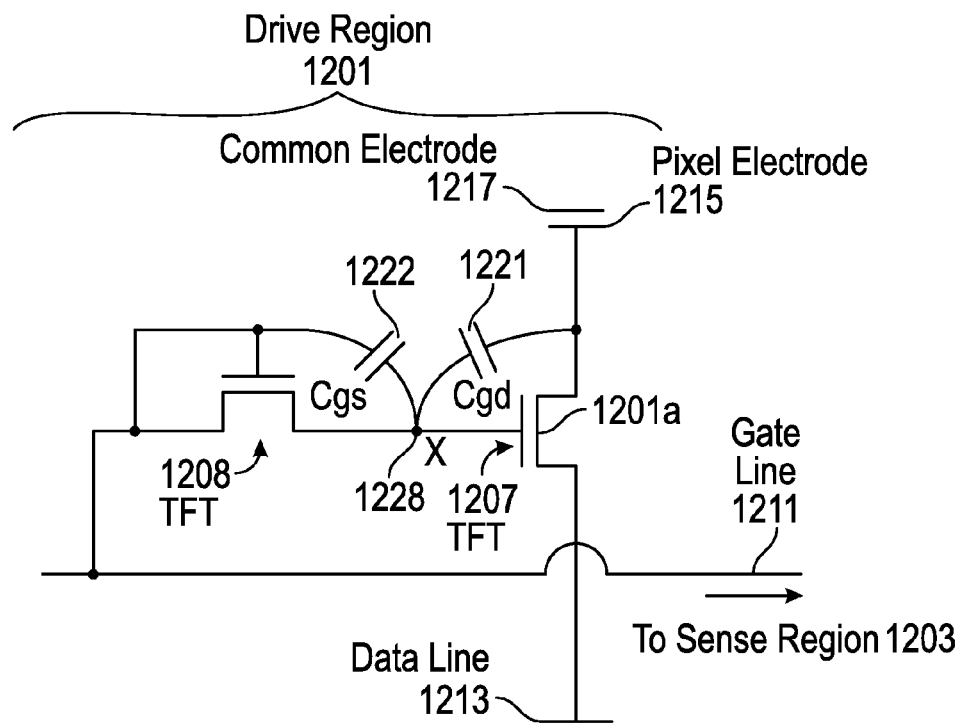
FIG. 12 illustrates an example configuration in which a diode-connected transistor can be inserted between a gate line and a gate terminal of a pixel TFT of a display pixel.

FIG. 12 illustrates an example configuration in which a diode-connected transistor 1208 can be inserted between a gate line 1211 and a gate terminal of a pixel TFT 1207 of a display pixel 1201a. The configuration of display pixel 1201a can be substantially that of display pixel 701a in FIG. 7, except that diode-connected TFT 1208 can be inserted between gate line 1211 and the gate terminal of TFT 1207, as shown. TFT 1208 can be "diode-connected" because the gate terminal of the TFT can be connected to the drain terminal of the TFT. Although not shown in FIG. 12, the display pixel in sense region 1203 to which display pixel 1201a can be connected can have a similar configuration as display pixel 1201a. Indeed, all display pixels in the touch screen can have a diode-connected TFT inserted between their respective gate lines and the gate terminals of their respective pixel TFTs. Because TFT 1208 can be diode-connected, it can always substantially transfer the voltage at its drain terminal to its source terminal. Therefore, diode-connected TFT 1208 can behave substantially transparently during the DC voltage operation of the touch screen.

However, diode-connected TFT 1208 can substantially alter the total capacitance seen between pixel electrode 1215 and gate line 1211 (C$_{Gate-Pixel}$ 721 in FIG. 7). In particular, capacitance C$_{gd}$ 1221 can exist between pixel electrode 1215 and node X 1228. As described above, C$_{gd}$ 1221 can include the gate-to-drain capacitance of TFT 1207. Capacitance C$_{gs}$ 1222 can exist between node X 1228 and gate line 1211. $C_{gs}$ 1222 can include the gate-to-source capacitance of TFT 1208. In some examples, TFT 1208 can have the same or similar characteristics (size, shape, materials, etc.) as TFT 1207, making $C_{gd}$ 1221 and $C_{gs}$ 1222 substantially equal. The capacitive pathway between pixel electrode 1215 and gate line 1211 can then be a series combination of $C_{gd}$ 1221 and $C_{gs}$ 1222, which can be approximately one-half of $C_{gd}$ (or one-half of $C_{gs}$) when $C_{gd}$ and $C_{gs}$ are substantially equal.

As a comparison, in the configuration of FIG. 7, the variable portion of $C_{Gate-Pixel}$ 721 can be substantially the gate-to-drain capacitance of TFT 707. In contrast, in the configuration of FIG. 12, the variable portion of the total capacitance between pixel electrode 1215 and gate line 1211 can be substantially one-half of the gate-to-drain capacitance of TFT 1207. This reduction in the variable capacitance can reduce the effect of the parasitic coupling pathway that may exist between drive region 1201 and sense region 1203 during a touch sensing phase of the touch screen.

As mentioned above, a display pixel in the touch screen of the disclosure can include two TFTs connected in series instead of a single TFT. In such examples, severing the coupling pathway between display pixels in the drive and sense regions can be accomplished by decoupling the gate lines of the two TFTs that can exist in every display pixel in the touch screen.

Figure 13A:
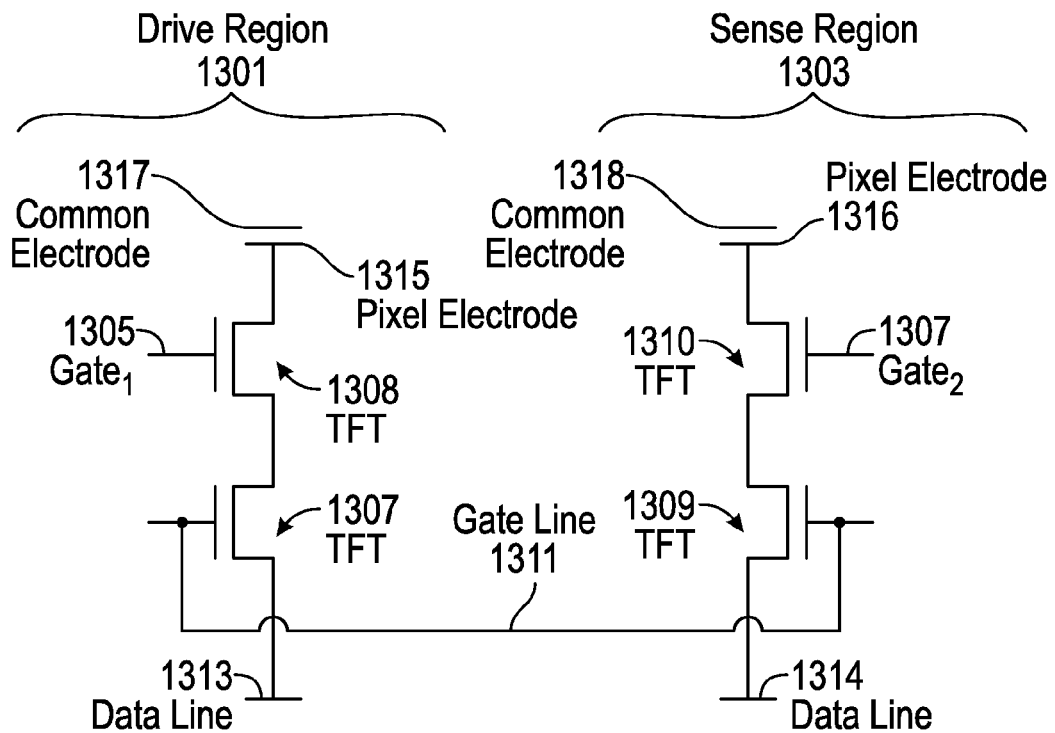
FIG. 13A illustrates an example configuration in which gate lines of two TFTs in a display pixel can be decoupled.

FIG. 13A illustrates an example configuration in which gate lines of two TFTs in a display pixel can be decoupled. The configuration of FIG. 13A can be substantially that of FIG. 7, except that instead of having a single TFT 1307, the display pixel in drive region 1301 can have a second TFT 1308 connected in series with TFT 1307. In some examples, the gate terminals of TFTs 1307 and 1308 can both be connected to gate line 1311. In the example of FIG. 13A, however, the gate terminal of TFT 1308, gate$_1$ 1305, can be isolated (or "decoupled") from the gate terminal of TFT 1307, and thus from gate line 1311. The discussion above can similarly hold for the display pixel in sense region 1303. Further, the gate terminal of TFT 1310, gate$_2$ 1307, can be different and isolated from gate$_1$ 1305.

During a touch sensing phase, in addition to the operation described with reference to FIG. 7, the voltages at gate$_1$ 1305 and gate$_2$ 1307 can be set such that TFTs 1308 and 1310 can be turned off. During a display phase, the voltages at gate$_1$ 1305 and gate$_2$ 1307 can be set such that TFTs 1308 and 1310 can be turned on. In that state, the voltage at gate line 1311 can control the behavior of TFTs 1307 and 1309, and the display pixels can operate substantially as described with reference to FIG. 7. In some examples, the voltages at gate$_1$ 1305 and gate$_2$ 1307 can be the same voltages as those at gate line 1311; namely, VGL during the touch sensing phase and VGH during the display phase.

By separating the gate lines of TFTs 1307, 1308, 1309 and 1310, as shown, the parasitic pathway that can exist between drive region 701 and sense region 703 can be severed. In particular, during a touch sensing phase, most, if not all, of the voltage noise signals generated at common electrode 1317 can couple to pixel electrode 1315, and then to gate$_1$ 1305 via the gate-to-drain capacitance of TFT 1308. Because gate$_1$ 1305 can be separate and isolated from gate$_2$ 1307, no direct pathway can exist between the display pixels in drive region 1301 and sense region 1303 through which the noise can couple. In some examples, gate$_1$ 1305 can be connected to and controlled by a light shield metal, such as ITO, that can exist underneath TFT 1308 in the display pixel material stackup. By using a preexisting light shield metal to control gate$_1$ 1305, the need for extra routing and traces can be minimized. Similarly, gate$_2$ 1307 can be connected to and controlled by a light shield metal, such as ITO, that can exist underneath TFT 1310.

Figure 13B:
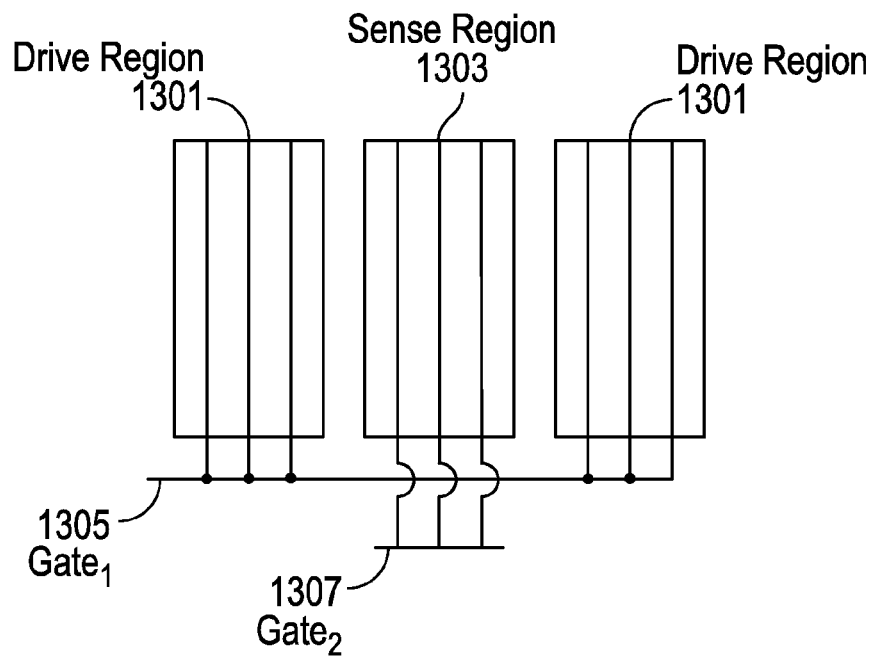
FIG. 13B illustrates an example configuration in which the gate terminals of the second TFTs in display pixels in drive regions can be connected to each other, and the gate terminals of the second TFTs in display pixels in sense regions can be connected to each other.

In some examples, the light shields of display pixels in drive regions can be connected together, and the light shields of display pixels in sense regions can be connected together. That is to say that gate$_1$ 1305 can be connected to other display pixels in drive regions 1301, and gate$_2$ 1307 can be connected to other display pixels in sense regions 1303. FIG. 13B illustrates an example configuration in which the gate terminals of the second TFTs in display pixels in drive regions can be connected to each other, and the gate terminals of the second TFTs in display pixels in sense regions can be connected to each other. By using such a connection scheme, a direct coupling pathway between display pixels in drive region 1301 and display pixels in sense region 1303 can be avoided.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

Therefore, according to the above, some examples of the disclosure are directed to a touch screen comprising a first drive region, a first sense region, and a first display pixel in the first drive region, the first display pixel configurable to be decoupled from a second display pixel in the first sense region during at least a touch sensing phase of the touch screen, the first and second display pixels being in a row of display pixels. Additionally or alternatively to one or more of the examples disclosed above, in some examples, the touch screen further comprises a first gate line electrically connected to the first display pixel, and a second gate line, different from the first gate line, electrically connected to the second display pixel. Additionally or alternatively to one or more of the examples disclosed above, in some examples, the touch screen further comprises a third display pixel in a second drive region of the touch screen, wherein the first gate line is electrically connected to the third display pixel. Additionally or alternatively to one or more of the examples disclosed above, in some examples, the touch screen further comprises a third display pixel in a second sense region of the touch screen, wherein the second gate line is electrically connected to the third display pixel. Additionally or alternatively to one or more of the examples disclosed above, in some examples, the touch screen further comprises a gate line electrically connected to the first and second display pixels, the gate line including a decoupling portion between the first and second display pixels. Additionally or alternatively to one or more of the examples disclosed above, in some examples, the decoupling portion comprises a capacitor electrically connected to a diode. Additionally or alternatively to one or more of the examples disclosed above, in some examples, the decoupling portion comprises a diode electrically connected to a transistor. Additionally or alternatively to one or more of the examples disclosed above, in some examples, the decoupling portion comprises a transistor controlled by a timing signal, the timing signal controlling a transition between the touch sensing phase and a display phase of the touch screen. Additionally or alternatively to one or more of the examples disclosed above, in some examples, the decoupling portion comprises a first diode and a second diode electrically connected in a ring configuration. Additionally or alternatively to one or more of the examples disclosed above, in some examples, the decoupling portion comprises a switch controlled by a timing signal, the timing signal controlling a transition between the touch sensing phase and a display phase of the touch screen, and a diode electrically connected to the switch.

Some examples of the disclosure are directed to a touch screen comprising a display pixel including a first transistor and a second transistor, the second transistor being electrically connected to a gate terminal of the first transistor and being diode-connected, and a gate line electrically connected to the second transistor. Additionally or alternatively to one or more of the examples disclosed above, in some examples, the first transistor has a first size, the second transistor has a second size, and the first and second sizes are substantially equal. Additionally or alternatively to one or more of the examples disclosed above, in some examples, a gate-to-drain capacitance of the first transistor is substantially equal to a gate-to-source capacitance of the second transistor.

Some examples of the disclosure are directed to a touch screen comprising a first display pixel in a first drive region of the touch screen, the first display pixel including a first transistor and a second transistor, a second display pixel in a first sense region of the touch screen, the second display pixel including a third transistor and a fourth transistor, a first gate line electrically connected the first and third transistors, a second gate line electrically connected to the second transistor, and a third gate line electrically connected to the fourth transistor. Additionally or alternatively to one or more of the examples disclosed above, in some examples, the touch screen further comprises a third display pixel in a second drive region of the touch screen, the third display pixel including a fifth transistor and a sixth transistor, wherein the first gate line is electrically connected to the fifth transistor, and the second gate line is electrically connected to the sixth transistor. Additionally or alternatively to one or more of the examples disclosed above, in some examples, the touch screen further comprises a third display pixel in a second sense region of the touch screen, the third display pixel including a fifth transistor and a sixth transistor, wherein the first gate line is electrically connected to the fifth transistor, and the third gate line is electrically connected to the sixth transistor.

Some examples of the disclosure are directed to a method for operating a touch screen, the method comprising providing a first drive region and a first sense region, and decoupling a first display pixel in the first drive region from a second display pixel in the first sense region during at least a touch sensing phase of the touch screen, the first and second display pixels being in a row of display pixels. Additionally or alternatively to one or more of the examples disclosed above, in some examples, the method further comprises electrically connecting a first gate line to the first display pixel and to a third display pixel in a second drive region of the touch screen, and electrically connecting a second gate line, different from the first gate line, to the second display pixel and to a fourth display pixel in a second sense region of the touch screen. Additionally or alternatively to one or more of the examples disclosed above, in some examples, the method further comprises electrically connecting a first gate line to the first and second display pixels, the first gate line including a decoupling portion between the first and second display pixels.

Some examples of the disclosure are directed to a method for operating a touch screen, the method comprising providing a display pixel including a first transistor and a second transistor, electrically connecting the second transistor to a gate terminal of the first transistor, the second transistor being diode-connected, and electrically connecting a gate line to the second transistor. Additionally or alternatively to one or more of the examples disclosed above, in some examples, the first transistor has a first size, the second transistor has a second size, and the first and second sizes are substantially equal. Additionally or alternatively to one or more of the examples disclosed above, in some examples, a gate-to-drain capacitance of the first transistor is substantially equal to a gate-to-source capacitance of the second transistor.

Some examples of the disclosure are directed to a method for operating a touch screen, the method comprising providing a first display pixel in a first drive region of the touch screen, the first display pixel including a first transistor and a second transistor, providing a second display pixel in a first sense region of the touch screen, the second display pixel including a third transistor and a fourth transistor, electrically connecting a first gate line to the first and third transistors, electrically connecting a second gate line to the second transistor, and electrically connecting a third gate line to the fourth transistor. Additionally or alternatively to one or more of the examples disclosed above, in some examples, the method further comprises providing a third display pixel in a second drive region of the touch screen, the third display pixel including a fifth transistor and a sixth transistor, electrically connecting the first gate line to the fifth transistor, and electrically connecting the second gate line to the sixth transistor. Additionally or alternatively to one or more of the examples disclosed above, in some examples, the method further comprises providing a third display pixel in a second sense region of the touch screen, the third display pixel including a fifth transistor and a sixth transistor, electrically connecting the first gate line to the fifth transistor, and electrically connecting the third gate line to the sixth transistor.

The invention claimed is:

1. A touch screen comprising:
   a first drive region;
   a first sense region; and
   a first display pixel in the first drive region coupled to a first gate line, wherein the first display pixel includes a first transistor, and wherein the first transistor includes a first gate; and
   a second display pixel in the first sense region coupled to a second gate line, different from the first gate line, wherein the second display pixel includes a second transistor, and wherein the second transistor includes a second gate;
   wherein the first gate line is coupled to the first gate and the second gate line is coupled to the second gate, wherein the first gate line is decoupled from the second gate line during at least a touch sensing phase of the touch screen, and wherein the first gate line is coupled to the second gate line at least during a display phase of the touch screen.

2. The touch screen of claim 1, further comprising a third display pixel in a second drive region of the touch screen, wherein the first gate line is coupled to the third display pixel.

3. The touch screen of claim 1, further comprising a third display pixel in a second sense region of the touch screen, wherein the second gate line is coupled to the third display pixel.

4. The touch screen of claim 1, further comprising a decoupling portion between the first and second gate lines.

5. The touch screen of claim 4, wherein the decoupling portion comprises a capacitor electrically connected to a diode.

6. The touch screen of claim 4, wherein the decoupling portion comprises a diode electrically connected to a transistor.

7. The touch screen of claim 4, wherein the decoupling portion comprises a transistor controlled by a timing signal, the timing signal controlling a transition between the touch sensing phase and the display phase of the touch screen.

8. The touch screen of claim 4, wherein the decoupling portion comprises a first diode and a second diode electrically connected in a ring configuration.

9. The touch screen of claim 4, wherein the decoupling portion comprises:
a switch controlled by a timing signal, the timing signal controlling a transition between the touch sensing phase and the display phase of the touch screen; and
a diode electrically connected to the switch.

10. The touch screen of claim 1, wherein the first gate line is configured to pass through the first sense region.

11. The touch screen of claim 10, wherein the second gate line is configured to pass through the first drive region.

12. The touch screen of claim 10, wherein the first sense region further comprises a first sense electrode, and the first gate line is configured to pass underneath the first sense electrode.

13. The touch screen of claim 12, wherein the first sense electrode is configured to operate as at least a portion of touch sensing circuitry during the touch sensing phase of the touch screen and is configured to further operate as at least a portion of a display sensing circuitry during the display phase of the touch screen.

14. The touch screen of claim 1, further comprising a third display pixel in the first sense region.

15. The touch screen of claim 14, wherein the third display pixel is coupled to the second gate line and is aligned with the first and second display pixels in the first direction.

16. The touch screen of claim 14, wherein the third display pixel is coupled to a third gate line, wherein the third gate line is decoupled from the first and second gate line and the third display pixel is aligned with the second display pixel in a second direction, perpendicular to the first direction.

17. The touch screen of claim 14, wherein the second display pixel and the third display pixel are immediately adjacent to one another.

18. The touch screen of claim 1, wherein the second gate line is parallel to the first gate line.

19. A method for operating a touch screen, the method comprising:
providing a first drive region and a first sense region;
applying a first voltage to a first gate line coupled to a first display pixel in the first drive region, wherein the first display pixel includes a first transistor, and wherein the first transistor includes a first gate; and
applying a second voltage to a second gate line coupled to a second display pixel in the first sense region, wherein the second display pixel includes a second transistor, and wherein the second transistor includes a second gate;
wherein the first gate line is coupled to the first gate and the second gate line is coupled to the second gate, wherein the first gate line is decoupled from the second gate line during at least a touch sensing phase of the touch screen, and wherein the first gate line is coupled to the second gate line at least during a display phase of the touch screen.

20. The method of claim 19, wherein:
a third display pixel in a second drive region of the touch screen is coupled to the first gate line; and
a fourth display pixel in a second sense region of the touch screen is coupled to the second gate line.

21. The method of claim 19, further comprising:
electrically connecting the first gate line to the second gate line via a decoupling portion between the first and second gate lines.

22. The method of claim 19, wherein the first gate line passes through the first sense region.

23. The method of claim 22, wherein the second gate line passes through the first drive region.

24. The method of claim 22, wherein the first sense region further comprises a first sense electrode, and the first gate line is configured to pass underneath the first sense electrode.

25. The method of claim 24, wherein the first sense electrode is configured to operate as at least a portion of touch sensing circuitry during the touch sensing phase of the touch screen, and is configured to further operate as at least a portion of a display sensing circuitry during a display phase of the touch screen.

26. The method of claim 19, wherein the second gate line is parallel to the first gate line.

* * * * *